(12) United States Patent
Kang

(10) Patent No.: US 8,862,649 B2
(45) Date of Patent: Oct. 14, 2014

(54) SMOOTHING APPARATUS FOR PEAK WINDOWING

(75) Inventor: In-Tae Kang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 664 days.

(21) Appl. No.: 13/089,126

(22) Filed: Apr. 18, 2011

(65) Prior Publication Data

US 2011/0258244 A1    Oct. 20, 2011

(30) Foreign Application Priority Data

Apr. 19, 2010   (KR) .................. 10-2010-0035963

(51) Int. Cl.
*G06F 17/10* (2006.01)
*H04L 27/26* (2006.01)

(52) U.S. Cl.
CPC ................ *H04L 27/2624* (2013.01)
USPC ......................... 708/319; 708/320

(58) Field of Classification Search
CPC .............. H03H 17/06; H03H 17/0294; H03H 17/0223; H03H 17/0225; H03H 17/0607; H03H 17/04; H03H 17/0461; H03H 17/02
USPC ................................. 708/319–320
See application file for complete search history.

(56) References Cited

U.S. PATENT DOCUMENTS

| | | | | |
|---|---|---|---|---|
| 4,356,559 A | * | 10/1982 | Candy et al. ................... | 708/313 |
| 4,698,696 A | * | 10/1987 | Matsuo ......................... | 386/269 |
| 5,058,047 A | * | 10/1991 | Chung .......................... | 708/322 |
| 2003/0086507 A1 | * | 5/2003 | Kim et al. ...................... | 375/297 |

* cited by examiner

Primary Examiner — Tan V. Mai

(57) ABSTRACT

A smoothing apparatus for peak windowing includes an operator for generating a first input signal for smoothing using an input signal for peak windowing and a predetermined clipping threshold level. The apparatus also includes a subtractor for subtracting a feedback signal from the first input signal, and a maximum operator for generating a second input signal. The apparatus also includes a feedback path for generating a feedback signal for a next smoothed input signal by multiplying samples of the second input signal by window coefficients in a first window coefficient combination and a predetermined gain and summing up the multiplication results. The apparatus further includes a convolutional operator for generating a smoothed signal by multiplying samples of the second input signal by window coefficients in a second window coefficient combination for low pass filtering and summing up the multiplication results.

20 Claims, 22 Drawing Sheets

SMOOTHING APPARATUS FOR PEAK WINDOWING

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Apr. 19, 2010 and assigned Serial No. 10-2010-0035963, the entire disclosure of which is hereby incorporated by reference.

TECHNICAL FIELD OF THE INVENTION

The present invention relates generally to a Power Amplifier (PA), and more particularly, to a smoothing apparatus for peak windowing, which reduces a Peak to Average Power Ratio (PAPR) for linearization of a PA.

BACKGROUND OF THE INVENTION

In the wireless communications market, due to the increasing demands not only for voice call services but also for mass data services such as various multimedia Internet services, Orthogonal Frequency Division Multiplexing (OFDM), Single Carrier Frequency Division Multiplexing (SC-FDMA), and Wideband Code Division Multiple Access (WCDMA) are attracting attention as wireless transmission technologies capable of meeting the above demands. These technologies are applied to standards such as IEEE 802.16e Wireless Broadband (WiBro) or Mobile Worldwide Interoperability for Microwave Access (Mobile WiMAX), Wireless Local Area Network (WLAN), and 3rd Generation Partnership Project (3GPP) Long Term Evolution (LTE).

OFDM is a kind of Multi-Carrier Modulation (MCM) that transmits signal information on frequency-domain subcarriers. Therefore, an actually transmitted signal is a time-domain signal that underwent Inverse Fast Fourier Transform (IFFT) on a symbol-by-symbol basis, and a signal after undergoing IFFT has characteristics that amplitude thereof is not maintained constant. Thus, in OFDM, a PAPR is very significant compared with that in other modulation schemes, and such characteristics are obstacles to efficient use of a PA.

A high-PAPR input signal may deviate from a linear operation range of a PA, causing distortion at an output stage of the PA. In this situation, to obtain the maximum output, a back-off scheme may be used that lowers power of an input signal so that the PA may operate in a linear operation range. However, in the back-off scheme, an increase in back-off value for lowering power of an input signal leads to an increase in power consumption, deteriorating efficiency of the PA. In this way, a high-PAPR signal reduces power efficiency or uses a high-spec PA, increasing hardware prices.

Therefore, a mobile communication system using MCM such as OFDM and SC-FDMA, or Single-Carrier Modulation (SCM), needs technology for efficiently reducing a PAPR which occurs when a plurality of signals are mixed. Methods for reducing a PAPR may include clipping, block coding, phase adjustment, and the like. Clipping, a conventional technique for reducing a PAPR, is a technique that maintains a phase of a time-domain signal having undergone IFFT, and restricts only amplitude thereof below a desired threshold level. However, in the clipping technique, an input signal is cut at a threshold level, causing non-linear distortion, and to compensate for the non-linear distortion, an additional process such as filtering may be needed. However, filtering leads to peak regrowth that re-grows the signal components cut by clipping, causing a PAPR to re-increase.

Therefore, more efficient technology for reducing a PAPR of an input signal is needed for a PA in a communication system using MCM such as OFDM and SC-FDMA, or SCM.

SUMMARY OF THE INVENTION

To address the above-discussed deficiencies of the prior art, it is a primary object of exemplary embodiments of the present invention to provide an apparatus for reducing a PAPR, for linearization of a Power Amplifier (PA).

Exemplary embodiments of the present invention provide an apparatus employing peak windowing to reduce a PAPR of an MCM or SCM signal.

Exemplary embodiments of the present invention provide a smoothing apparatus for reducing a PAPR by applying peak windowing.

In accordance with one aspect of the present invention, there is provided a smoothing apparatus for peak windowing. The apparatus includes an operator configured to generate a first input signal for smoothing using an input signal for peak windowing and a predetermined clipping threshold level. The apparatus also includes a subtractor configured to subtract a feedback signal from the first input signal. The apparatus further includes a maximum operator configured to generate a second input signal including one of each sample of the subtracted signal and '0', whichever is greater than the other. The apparatus also includes a feedback path configured to generate a feedback signal for a next smoothed input signal by multiplying samples of the second input signal by window coefficients in a first window coefficient combination and a predetermined gain and summing up the multiplication results. The apparatus further includes a convolutional operator configured to generate a smoothed signal by multiplying samples of the second input signal by window coefficients in a second window coefficient combination for low pass filtering and summing up the multiplication results. The second window coefficient combination includes the first window coefficient combination and a third window coefficient combination being different from the first window coefficient combination.

In accordance with another aspect of the present invention, there is provided a smoothing apparatus for peak windowing. The apparatus includes an operator configured to generate a first input signal for smoothing using an input signal for peak windowing and a predetermined clipping threshold level. The apparatus also includes a first filter block configured to filter the first input signal using a first gain and a first window coefficient combination including first window coefficients for low pass filtering, which have a symmetric structure. The apparatus further includes a subtractor configured to subtract an output of the first filter block from the first input signal. The apparatus also includes a maximum operator configured to generate a second input signal including one of each sample of an output of the subtractor and '0', whichever is greater than the other. The apparatus further includes a second filter block configured to filter the second input signal using a second gain and a second window coefficient combination including second window coefficients for low pass filtering, which have an asymmetric structure. The apparatus also includes an adder configured to generate a smoothed signal by adding an output of the first filter block to an output of the second filter block.

In accordance with further another aspect of the present invention, there is provided a smoothing apparatus for peak windowing. The apparatus includes an operator configured to generate a first input signal for smoothing using an input signal for peak windowing and a predetermined clipping threshold level. The apparatus also includes a subtractor configured to subtract a feedback signal from the first input signal. The apparatus further includes a maximum operator configured to generate a second input signal including one of each sample of the subtracted signal and '0', whichever is greater than the other. The apparatus also includes a feedback path configured to generate a feedback signal for a next input signal by multiplying samples of the second input signal by window coefficients in the first window coefficient combination and summing up the multiplication results. The apparatus further includes a comparator configured to compare a ratio of the feedback signal to the first input signal, with at least one predetermined threshold. The apparatus also includes a filter block configured to filter the second input single depending on the comparison result, using window coefficients in a second window coefficient combination for low pass filtering. The apparatus also includes a summer configured to generate a smoothed signal by summing up outputs of the filter block.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1A through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

A below-described embodiment of the present invention provides a peak windowing technique for reducing a PAPR of a high-PAPR signal such as an OFDM or SC-FDMA signal.

Figure 1A:
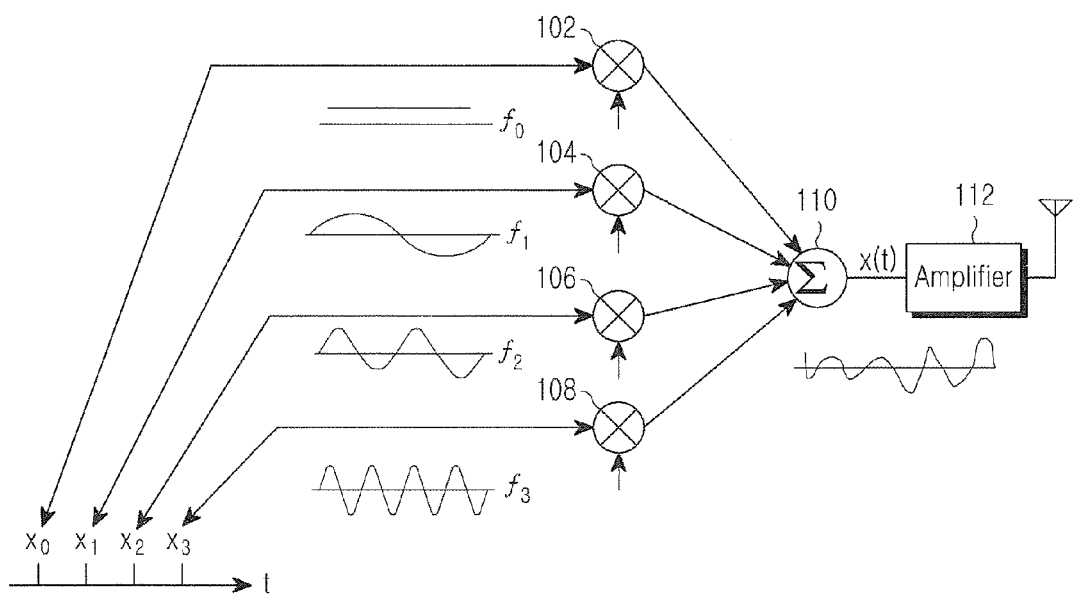
FIGS. 1A, 1B and 1C are diagrams illustrating occurrence of a PAPR in an OFDM system to which an embodiment of the present invention is applicable.
Figure 1B:
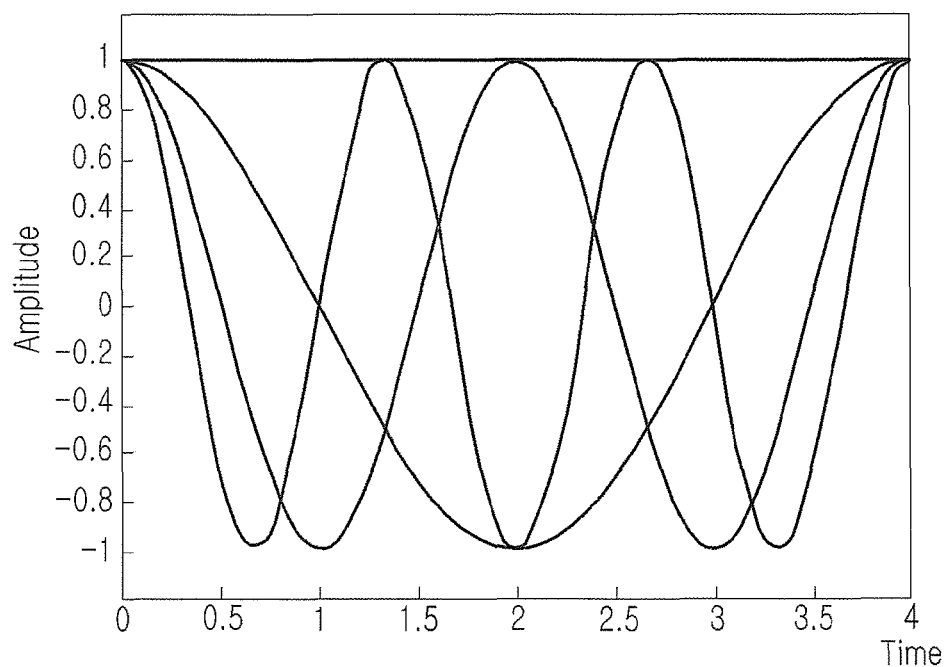
Figure 1C:
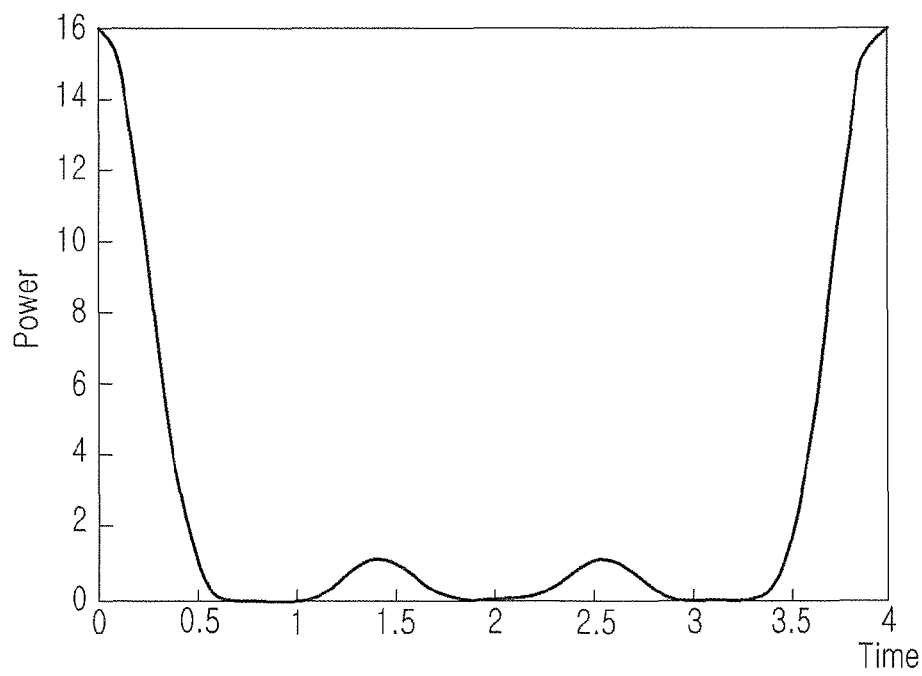

FIGS. 1A, 1B and 1C illustrate occurrence of a PAPR in an OFDM system to which an embodiment of the present invention is applicable.

Referring to FIG. 1A, symbols $x_0$, $x_1$, $x_2$, and $x_3$ to be transmitted are modulated with different subcarriers $f_0$, $f_1$, $f_2$, and $f_3$ by OFDM modulators 102, 104, 106, and 108, respectively. A summer 110 generates a summed signal x(t) by summing up the modulated signals, and the summed signal is amplified by an amplifier 112 and then transmitted via an antenna.

FIG. 1B illustrates waveforms of subcarrier signals being input to the OFDM modulators 102 to 108, and FIG. 1C illustrates a waveform of a signal that is output from the summer 110 after undergoing OFDM modulation. Signals before undergoing OFDM modulation are maintained constant over time in their amplitudes as illustrated in FIG. 1B, whereas signals after undergoing OFDM modulation are subject to significant change in their powers as illustrated in FIG. 1C. That is, a signal after undergoing OFDM modulation has a very high PAPR compared with a signal after undergoing other modulation schemes, which becomes an obstacle to efficient drive of a PA.

SC-FDMA applied to an uplink in an LTE system shows a lower PAPR compared with OFDMA.

Figure 2:
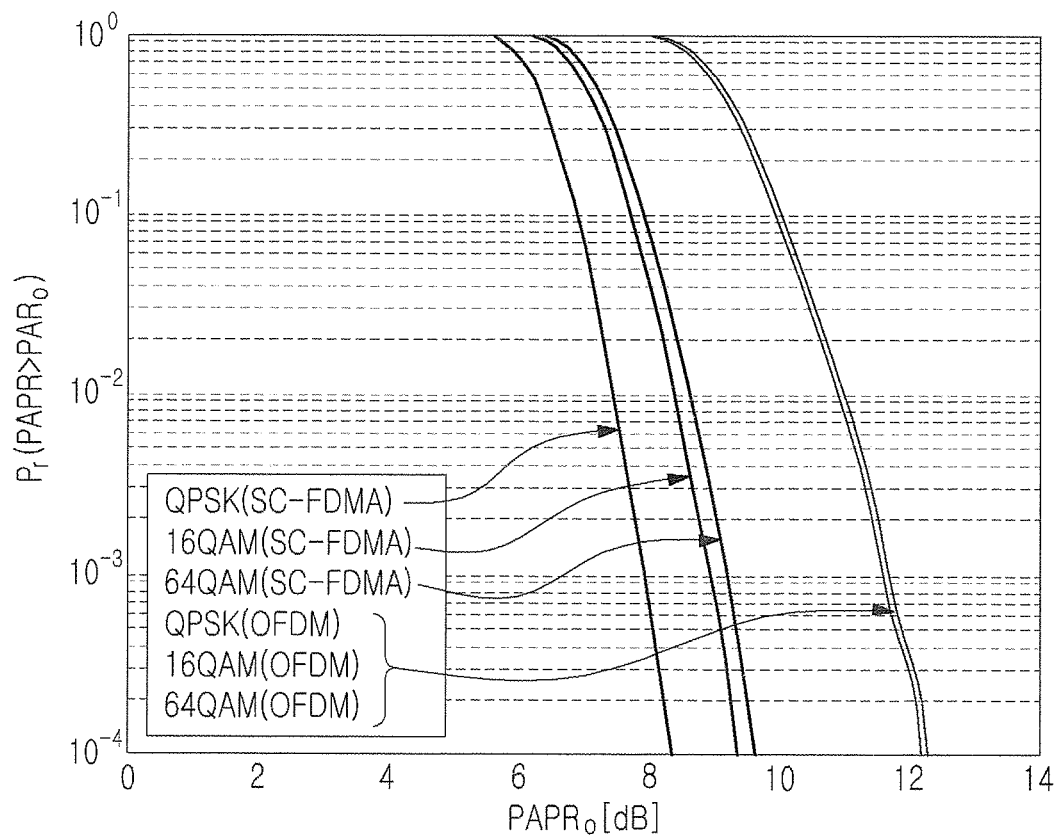
FIG. 2 is a graph illustrating a comparison made between OFDMA and SC-FDMA in PAPR characteristics.

FIG. 2 illustrates a comparison made between OFDMA and SC-FDMA in PAPR characteristics, in which Complementary Cumulative Distribution Function (CCDF) curves of symbol's PAPRs for Quadrature Phase Shift Keying (QPSK), 16-ary Quadrature Amplitude Modulation (16QAM), and 64-ary QAM (64QAM) in OFDMA and SC-FDMA are illustrated, respectively.

As illustrated, SC-FDMA is lower in PAPR than OFDMA by about 2.5 dB or more (on the basis of 64QAM whose PAPR is 10-4). However, while OFDMA modulation schemes are insignificant in PAPR difference, SC-FDMA modulation schemes are significant in PAPR difference. Therefore, SC-FDMA may further reduce the back-off for PAPR, as SC-FDMA does not use high-order modulations, unlike OFDMA.

Figure 3:
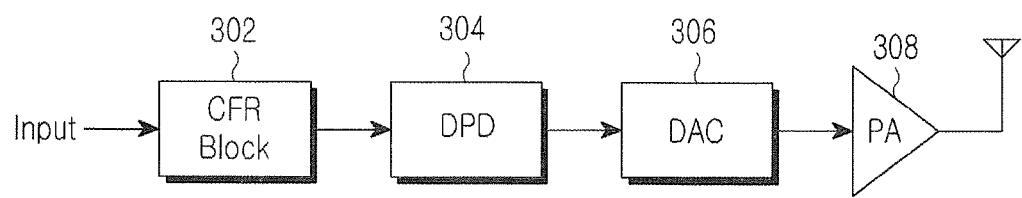
FIG. 3 is a block diagram illustrating an amplification unit for an OFDM system, which includes a structure for reducing a PAPR according to an embodiment of the present invention.

FIG. 3 illustrates an amplification unit for an OFDM system, which includes a structure for reducing a PAPR according to an embodiment of the present invention.

Referring to FIG. 3, an input signal, which is encoded and modulated according to a modulation scheme used in the system and includes an In-phase (I) signal component and a Quadrature-phase (Q) signal component, is input to a Crest Factor Reduction (CFR) block 302. The CFR block 302 adequately performs clipping on the input signal according to a clipping threshold level. A Digital Pre-Distortion (DPD) block 304 adds a pre-distortion signal to the clipped signal output from the CFR block 302 to suppress an Inter-Modulation Distortion (IMD) signal, which is a combination of harmonic signals generated during power amplification, thereby avoiding interference with a signal on an adjacent channel and improving an Error Vector Magnitude (EVM) of the input signal.

An output signal of the DPD block 304 is converted into an analog signal by a Digital-to-Analog Converter (DAC) 306, and a Power Amplifier (PA) 308 converts the analog signal to an associated power level, and transmits the power level-converted signal via the antenna.

Basically, the CFR block 302 includes clipping. Clipping compares a power level of each sample of an input I/Q signal with an associated clipping threshold level, and cuts samples higher than the clipping threshold level at the clipping threshold level, thereby generating a clipped signal including clipped signal samples. In this manner, if an input signal exceeds a specific clipping threshold level, clipping simply cuts the input signal, causing possible nonlinear distortion in the input signal. In order to compensate for the nonlinear distortion, the CFR block 302 may include peak windowing. To reduce the nonlinear distortion caused by clipping, peak windowing performs filtering on the clipped signal, thereby making sharp edges of the clipped signal smooth.

If a clipping threshold level is represented by A for an input signal x(n) to be transmitted, a signal $x_c(n)$ after undergoing clipping is defined as Equation (1) below.

$$x_c(n) = c(n)x(n) \qquad [\text{Eqn. 1}]$$

$$c(n) = \begin{cases} 1 & \text{if } |x(n)| \le A \\ \dfrac{A}{|x(n)|} & \text{if } |x(n)| > A \end{cases}$$

where c(n) is a clipping function representing a clipping window.

A Clipping Ratio (CR) is defined as follows.

$$CR = 20\log\left(\frac{A}{\sigma}\right)[\text{dB}] \qquad [\text{Eqn. 2}]$$

$$\sigma = \sqrt{E[|x(n)|^2]}$$

where σ means a Root Mean Square (RMS) power of an input signal x(n).

Figure 4:
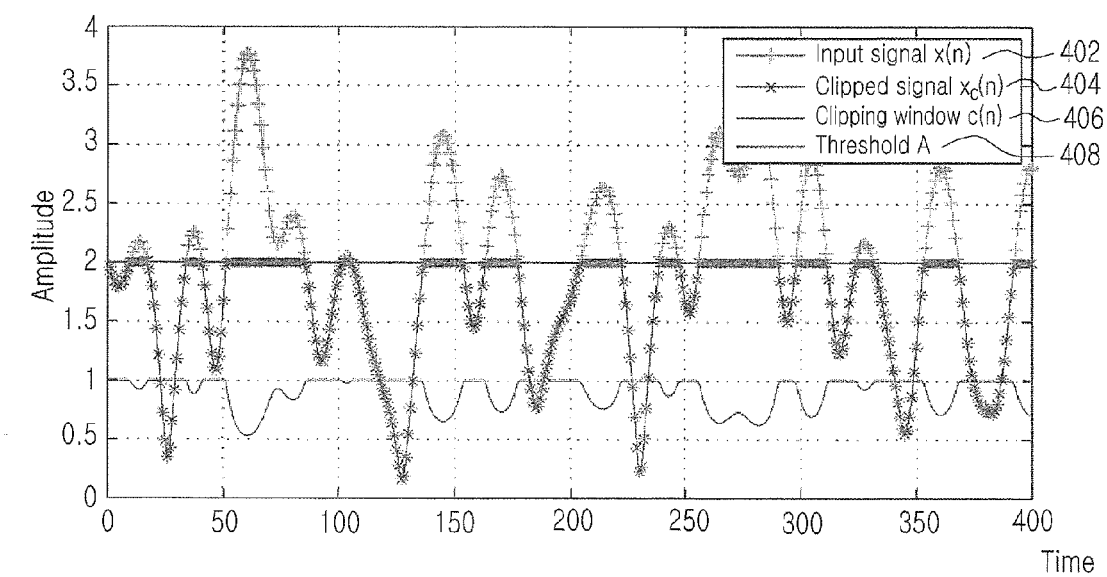
FIG. 4 is a comparative diagram illustrating a clipped signal for an input signal in a time domain.

FIG. 4 comparatively illustrates a clipped signal for an input signal in a time domain. As illustrated, an input signal x(n) 402 is sharply clipped at a clipping threshold level A 408 by being multiplied by a clipping window c(n) 406. Therefore, a clipped signal 404 (y(n)[=xc(n)]) includes the edges or portions that show an abrupt change in the time domain.

In this way, clipping cuts the portions of an input signal, at which a power level exceeds a threshold level, causing the sharp edges where the input signal suffers an abrupt change, thereby generating a high frequency. The generation of a high frequency causes in-band distortion and out-of-band radiation. Generally, in-band distortion is hard to control, but out-of-band radiation can be reduced by peak window filtering.

A peak windowing scheme may be implemented by smoothing a clipping window c(n) and then multiplying it by an input signal x(n), instead of directly multiplying the clipping window c(n) by the input signal x(n).

Figure 5:
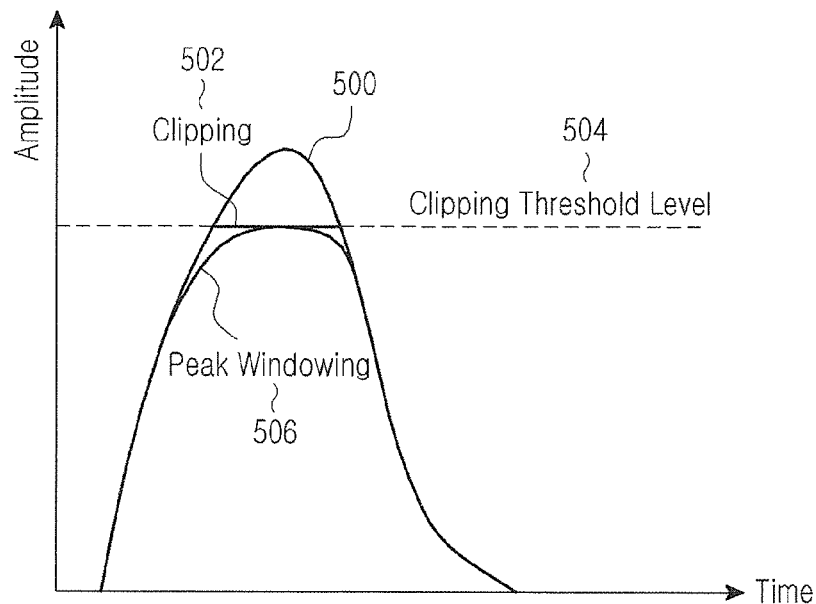
FIG. 5 is a diagram illustrating clipping and peak windowing techniques for reducing a PAPR of an input signal.

FIG. 5 illustrates clipping and peak windowing techniques for reducing a PAPR of an input signal. As illustrated, an input signal 500 is sharply clipped below a clipping threshold level 504 (see 502). Sharp edges of the clipped signal 502, where the input signal 500 suffers an abrupt change, are smoothly shaped by peak windowing (see 506).

Figure 6:
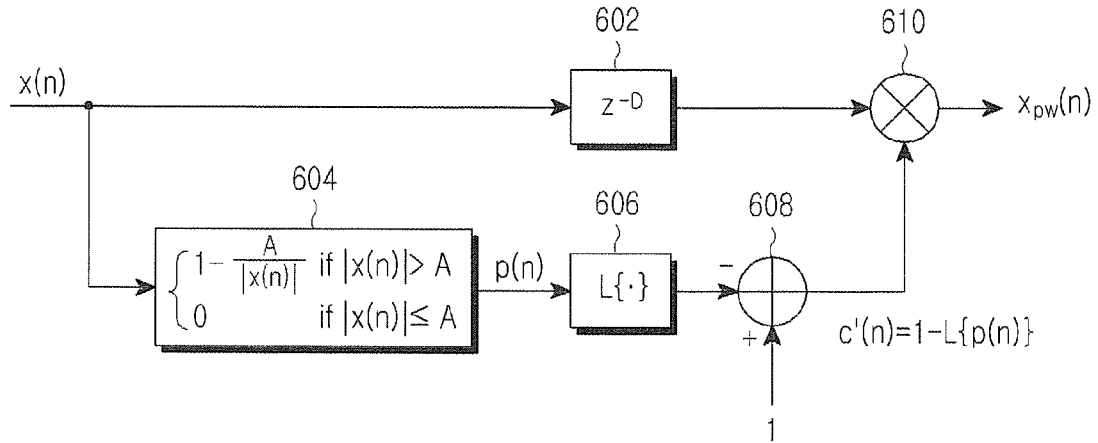
FIG. 6 is a block diagram illustrating an example implementation of a Crest Factor Reduction (CFR) block that includes a peak windowing structure according to an embodiment of the present invention.

FIG. 6 illustrates an example implementation of a CFR block that includes a peak windowing structure according to an embodiment of the present invention.

Referring to FIG. 6, an OFDM-modulated input signal x(n) is input to a delay 602 and an operator 604. If a signal level of the input signal x(n) exceeds a clipping threshold level A, the delay 602 delays the input signal x(n) by D and delivers the delayed signal to a multiplier 610 in order to compensate for the path delay D caused by the operator 604, a smoothing unit 606, and a subtractor 608. If a signal level of the input signal x(n) does not exceed the clipping threshold level A, the multiplier 610 multiplies the input signal received from the delay 602 by '1', i.e., outputs the received input signal without change.

If a signal level of the input signal x(n) exceeds the clipping threshold level A, the operator 604 calculates a clipping function c(n) by multiplying the clipping threshold level A by an inverse of the input signal x(n), and subtracts c(n) from '1', thereby outputting a smoothed input signal p(n) defined as Equation (3) below.

$$p(n) = 1 - c(n) = \begin{cases} 1 - \dfrac{A}{|x(n)|}, & \text{if } |x(n)| > A \\ 0 & \text{if } |x(n)| \le A \end{cases} \quad \text{[Eqn. 3]}$$

If a signal level of the input signal x(n) does not exceed the clipping threshold level A, the operator 604 outputs '0' since the clipping function c(n) is '1'. The smoothing unit 606 outputs $L\{p(n)\}$ by performing a smoothing operation on the input p(n), and the subtractor 608 subtracts $L\{p(n)\}$ from '1', thereby generating a smoothed signal c'(n) represented as shown in Equation (4) below.

$$c'(n) = 1 - L\{p(n)\} \quad \text{[Eqn. 4]}$$

where c'(n) represents a smoothed clipping function, and $L\{\ \}$ represents a smoothing function.

Finally, the multiplier 610 generates a peak-windowed signal $x_{pw}(n)$ by multiplying the input signal x(n) received through the delay 602 by the output of the subtractor 608.

Since p(n)=1−c(n), the peak-windowed signal $x_{pw}(n)$ can be rewritten as Equation (5) below.

$$x_{pw}(n) = c'(n)x(n) = (1 - L\{p(n)\})x(n) \quad \text{[Eqn. 5]}$$

Because $L\{p(n)\}$ is a smoothed signal, c'(n) is also a smoothed signal. Therefore, high-frequency components are reduced in a spectrum of c'(n). Since multiplying a signal by c'(n) in the time domain corresponds to performing convolution on Fourier transform in the frequency domain, out-of-band radiation may be reduced in convolution results on the signal having high-frequency components.

Figure 7:
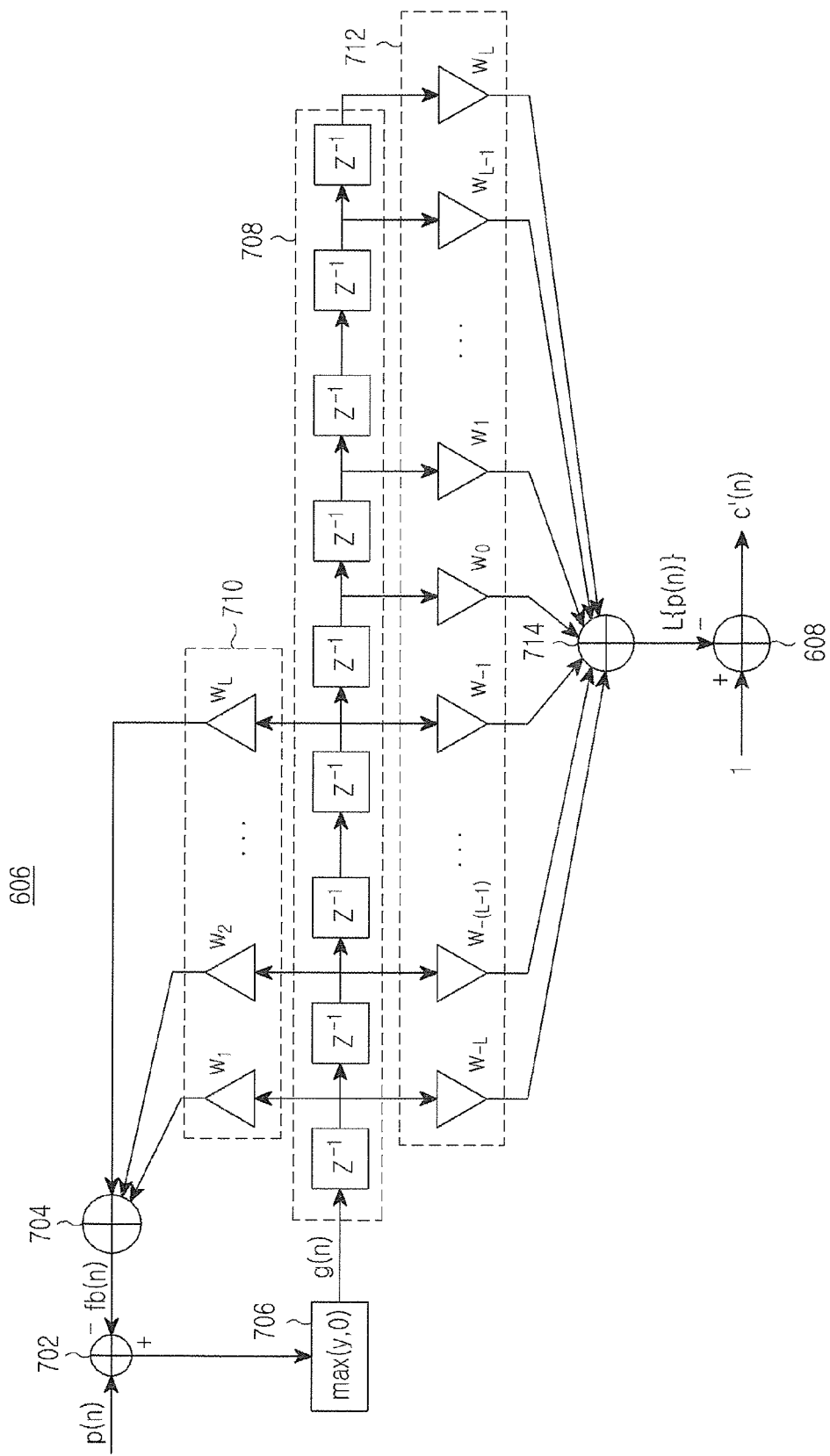
FIG. 7 is a diagram illustrating a structure of a smoothing unit that includes a Finite Impulse Response (FIR) feedback structure according to an embodiment of the present invention.

FIG. 7 illustrates a structure of a smoothing unit that includes a Finite Impulse Response (FIR) feedback structure according to an embodiment of the present invention.

Referring to FIG. 7, samples of a smoothed input signal p(n)=1−c(n) are sequentially input to the smoothing unit 606 realized by a FIR filter having a feedback structure. A subtractor 702 generates a signal y(n) by subtracting a feedback signal fb(n) received through a feedback path, from the input signal p(n). A maximum operator 706 selects one of y(n) and 0, whichever is greater than the other, and inputs the selected value to a first stage of a delay unit 708 including cascaded delays. Signals output from output taps of the delays are multiplied by their associated W filtering coefficients w(n)= $\{w_{-L}, w_{-(L-1)}, \ldots, w_{-1}, w_0, w_1, \ldots, w_{L-1}, w_L\}$ by a first multiplication unit 712. Commonly, the filtering coefficients may be symmetric in structure, i.e., $w_{-k} = w_k$ (k=1, . . . , L).

A first summer 714 generates $L\{p(n)\}$ or a smoothed p(n) by summing up the signals output from the first multiplication unit 712, and the $L\{p(n)\}$ is provided to the subtractor 608 in FIG. 6. The number W of filtering coefficients, i.e., a filter length or the number of filtering taps, is determined to meet the appropriate requirements through computer simulations.

The signals output from the output taps of the delays are multiplied by their associated filtering coefficients $w_{\lfloor W/2 \rfloor+1}$, $w_{\lfloor W/2 \rfloor+2}, w_{\lfloor W/2 \rfloor+3}, \ldots w_{W-1}$ among the filtering coefficients, by a second multiplication unit 710, and then provided to a second summer 704. The second summer 704 sums up the signals output from the second multiplication unit 710, and feeds back the summed signal to the subtractor 702. The second multiplication unit 710 and the second summer 704 constitute a feedback path in the smoothing unit 606.

The above-described peak windowing is implemented by adding a peak windowing filter after clipping, and shapes a clipped signal to be smoothed as shown in FIG. 5. Therefore, a sidelobe level thereof is remarkably reduced, but even some of peripheral signals other than the clipped signal are shaped, slightly degrading EVM performance. Thus, the number of filter taps is adjusted to meet the appropriate requirements through computer simulation tests.

As described above, clipping causes in-band distortion and out-of-band radiation. The in-band distortion may affect throughput of a terminal to which clipping is applied, or throughput of a base station itself, because it is directly related to EVM, Signal to Noise Ratio (SNR), and Bit Error Rate (BER). Alternatively, the out-of-band radiation may serve as interference to other users. Therefore, the out-of-band radiation may be represented as a performance index for an Adjacent Channel Leakage Ratio (ACLR) and the like. Generally, the out-of-band radiation is regulated by Federal Communications Commission (FCC) or telecommunication standard documents, and forced to meet Spectral Emission Mask (SEM).

EVM and ACLR performances are determined depending on how the smoothing function $L\{p(n)\}$ is designed, which is the most important block in peak windowing. If a general convolutional filter is used as a smoothing unit, $L\{p(n)\}$ is defined as p(n)*w(n) or p(n)*hw(n). Here, a window function w(n) means window coefficients of a bell-shaped low pass filter having a low cutoff frequency, and meets w(0)=w0=1. In addition, hw(n) represents a general Low Pass Filter (LPF), and is commonly designed to meet $\Sigma h(n)=1$ so that there is no gain change before and after filtering. Therefore, w(n) may be called a high-gain LPF, and likewise, hw(n) may be called a normalized window (hw(n)=w(n)/$\Sigma$w(n)).

Figure 8:
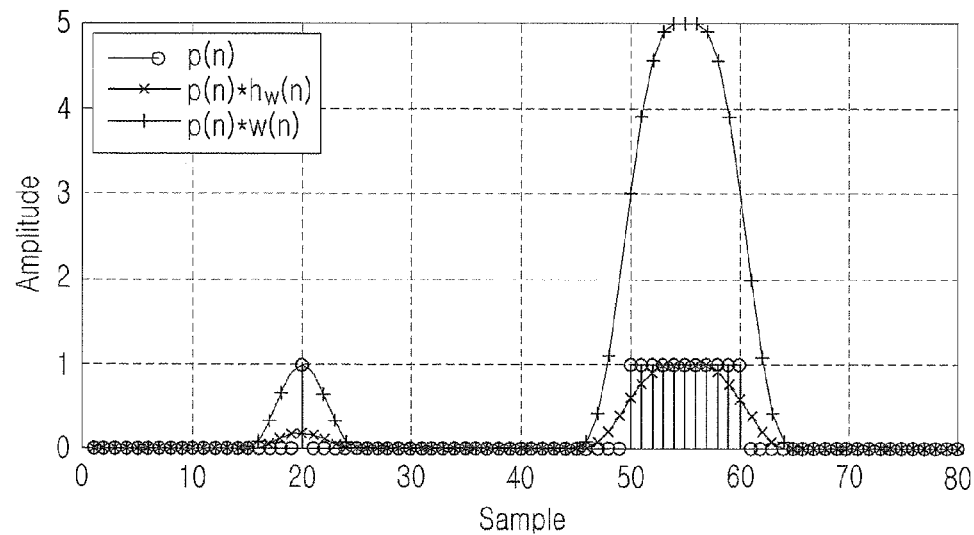
FIG. 8 is a graph illustrating windowing results when a general Low Pass Filter (LPF) is used.

FIG. 8 illustrates windowing results when a general LPF is used.

If $L\{p(n)\}$=p(n)*hw(n), a situation of $L\{p(n)\}$<p(n) may occur. Since c'(n)=[1−$L\{p(n)\}$]>1−p(n)=c(n), a situation of c'(n)x(n)>c(n)x(n)>=A may occur, causing peak regrowth. The peak regrowth is a phenomenon which often occurs in Clipping and Filtering (CNF) other than peak windowing, and an algorithm where peak regrowth occurs may not become an appropriate peak windowing algorithm.

Next, if $L\{p(n)\}$=p(n)*w(n), $L\{p(n)\}$>=p(n) is met, but a situation where $L\{p(n)\}$ is excessively greater than p(n), i.e., an overshooting phenomenon ($L\{p(n)\}$>>p(n)), may occur. Therefore, when c'(n)<<c(n), overcompensation occurs, causing a big EVM loss. In addition, if $L\{p(n)\}$>1, then c'(n)<0, and a sign of a signal is changed in c'(n)x(n), causing more significant EVM performance degradation. The overcompensation has a more significant influence on clustered peaks, in which samples, whose signal level exceeds a clipping threshold level A, occur in clusters, and this phenomenon more often occurs as a bandwidth of signals is narrower or an oversampling ratio is higher, thereby degrading EVM performance.

In order to alleviate the problem of the general convolutional filtering, p(n) may be transformed into another input single g(n) (p(n)-to-g(n) transformation), and then applied to w(n). This transformation is defined to meet g(n)*w(n)>=p(n). By using w(n) as described above, occurrence of peak regrowth may be prevented. In addition, compared with p(n), g(n) should be generally constructed in a small-gain signal or a low-density signal in order to reduce overcompensation.

Figure 9:
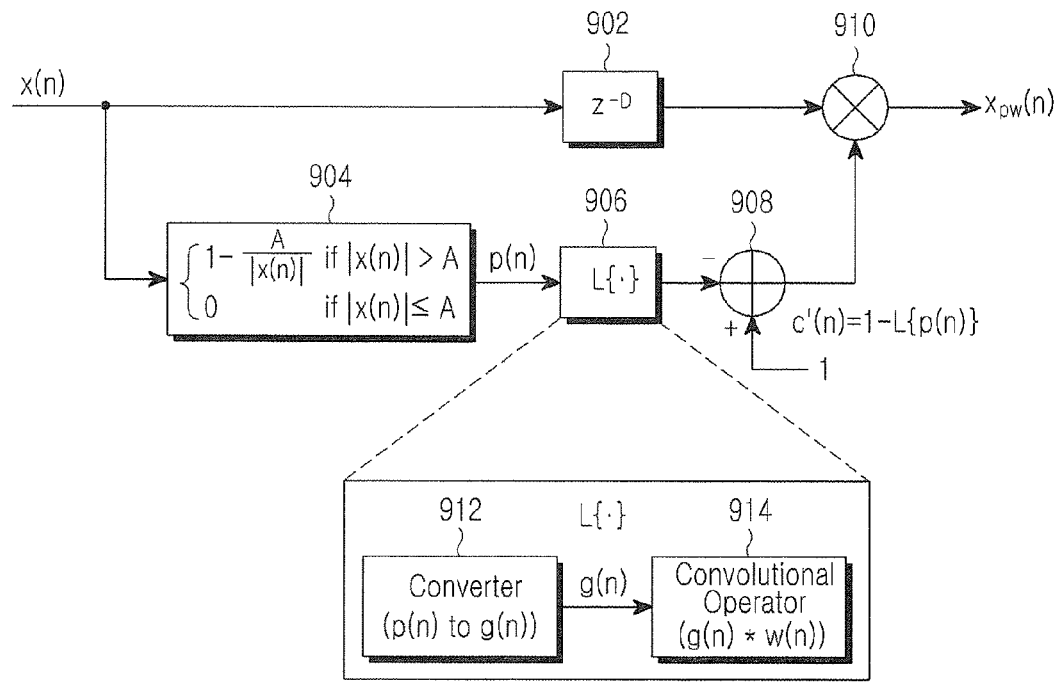
FIG. 9 is a block diagram illustrating the peak windowing structure of FIG. 6, including a FIR feedback structure implemented by signal conversion and filtering operation.

FIG. 9 illustrates the peak windowing structure of FIG. 6, including a FIR feedback structure implemented by signal conversion and filtering operation. The Conventional Feedback Structure (CFS) in FIG. 9 is known as a Vaananen's Feedback Structure (VFS).

Referring to FIG. 9, an input signal x(n) is input to a delay 902 and an operator 904. The delay 902 delays the input signal x(n) by D and then delivers the delayed signal to a multiplier 910.

If a signal level of the input signal x(n) exceeds a clipping threshold level A, the operator 904 calculates a clipping function c(n) by multiplying the predetermined threshold level A by an inverse of the input signal x(n) and subtracts the c(n) from '1', thereby outputting a smoothed input signal p(n). Alternatively, if a signal level of the input signal x(n) does not exceed the clipping threshold level A, the operator 904 outputs '0' since the clipping function c(n) is '1'. A smoothing unit 906 outputs L{p(n)} by performing a smoothing operation on the input p(n), and a subtractor 908 generates a smoothed signal c'(n) by subtracting L{p(n)} from '1'. Finally, the multiplier 910 generates a peak-windowed signal $x_{pw}(n)$ by multiplying the input signal x(n) received through the delay 902 by the output of the subtractor 908.

The smoothing unit 906 includes a converter 912 and a convolutional operator 914. In order to solve the overshooting problem occurring when L{p(n)}=p(n)*w(n), the converter 912 performs p(n)-to-g(n) conversion (transformation) through a feedback loop. The g(n) and its feedback value fb(n) meet Equation (6) below.

$$g(n) = \max\{p(n) - fb(n), 0\} \quad \text{[Eqn. 6]}$$
$$\text{where } fb(n) = \sum_{k=1}^{min\{n,L\}} w(k)g(n-k)$$

The fb(n) is affected by right-side coefficients w(n), (where n=1, ... L) of a window w(n).

If window coefficients used in the convolutional operator 914 are not matched with upper coefficients on the feedback path, a condition of g(n)*w(n)>=p(n) is not ensured.

As for the structure of FIG. 9, its implementation is efficient because it is generally based on the hardware structure of a widely-used FIR filter, and spectral performance thereof is also satisfactory for its small out-of-band radiation. However, the structure of FIG. 9 has problems in EVM performance. Though having solved the extreme overshooting problems for p(n)*w(n) as in FIG. 8, the structure of FIG. 9 still shows significant overshooting.

Figure 10:
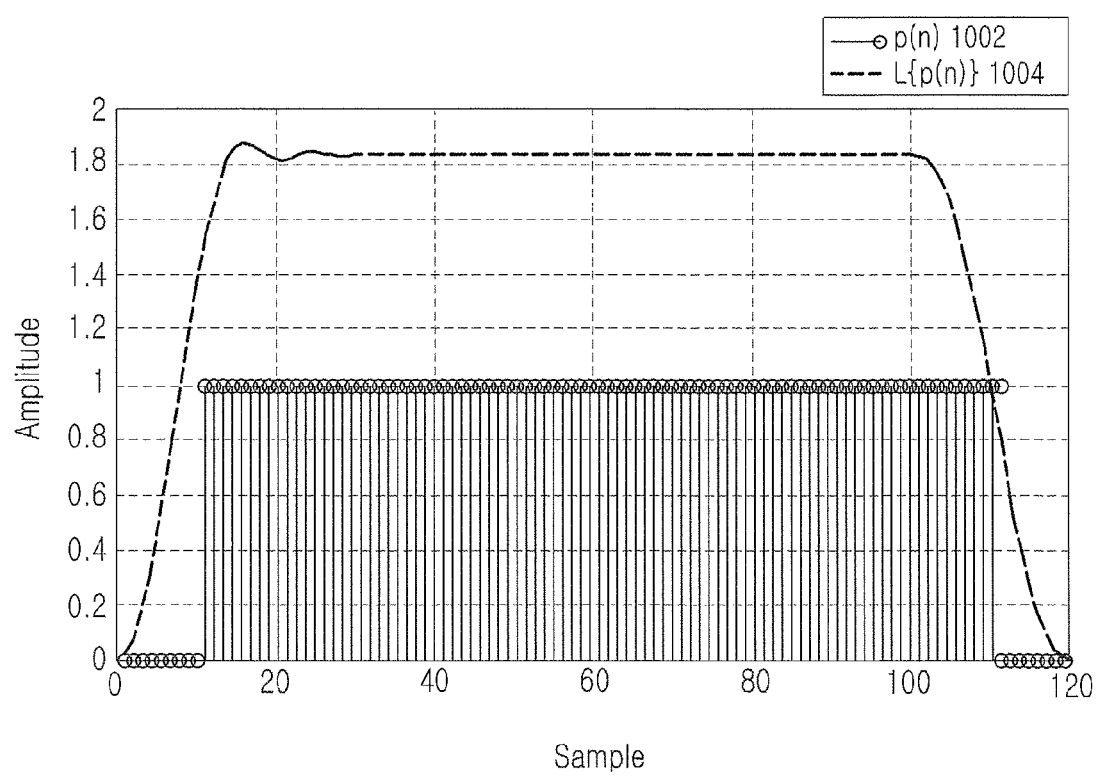
FIG. 10 is a graph illustrating problems in Error Vector Magnitude (EVM) efficiency by the FIR feedback structure of FIG. 9.

FIG. 10 illustrates problems in EVM efficiency by the FIR feedback structure of FIG. 9. In the drawing, a line 1002 represents p(n)=1, n=1, ..., 100, and a line or curve 1004 represents L{p(n)}=g(n)*w(n). Amplitude of a flat region of the line 1004 satisfies Equation (7) below.

$$\frac{L\{p(n)\}}{p(n)} \to \frac{\sum_{k=-L}^{L} w(k)}{\sum_{k=0}^{L} w(k)} \quad \text{[Eqn. 7]}$$

For a window with a long length L, the result of Equation (7) shows about '2'. That is, overcompensation occurs, which is two times or more the original amplitude '1' of p(n), so that the amplitude of x(n) is reduced greater than the clipping threshold level A.

The EVM performance degradation occurs (i) when a CR is low, i.e., when clipping occurs significantly because of a small value of the A, or (ii) when peaks are clustered due to an increase in oversampling ratio. The structure of FIG. 9 excessively overcompensates the input signal x(n) because L{p(n)}>>p(n) or (1-L{p(n)})<<c(n), causing a significant reduction in the input signal x(n). The significant reduction in the input signal makes the in-band distortion severe, increasing EVM and thus resulting in a decrease in SNR. The decrease in SNR affects BER performance.

Figure 11:
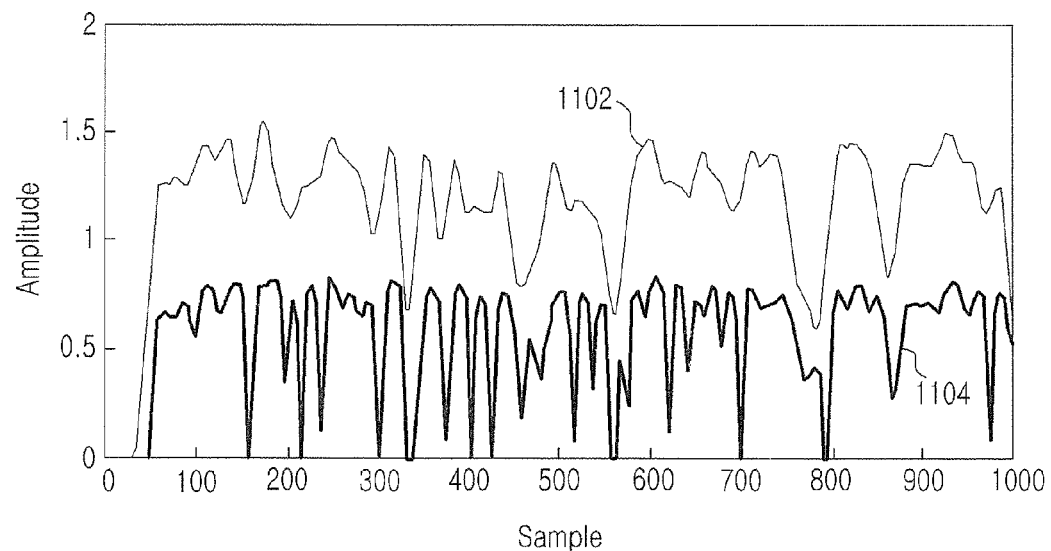
FIGS. 11 and 12 are graphs illustrating EVM performance by the FIR feedback structure.
Figure 12:
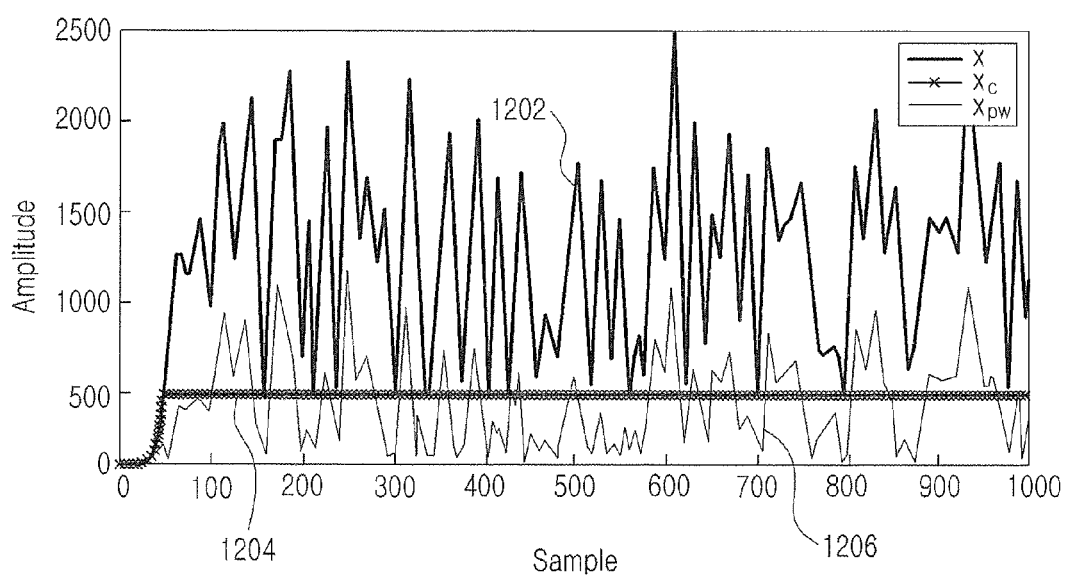

FIGS. 11 and 12 illustrate EVM performance by the above-described FIR feedback structure. In FIG. 11, a curve 1102 represents L{p(n)}=g(n)*w(n), and a curve 1104 represents p(n) for x(n). In FIG. 12, a curve 1202 represents an input signal x(n), a curve 1204 represents a clipped signal xc(n)=c(n)x(n), and a curve 1206 represents a peak-windowed signal xpw(n). As illustrated, when 1-L{p(n)}>=c(n), peak regrowth occurs, in which a sign of a signal is changed, significantly affecting the EVM.

In the below-described embodiment of the present invention, by applying peak windowing after clipping, a PAPR is reduced and influence on the BER and ACLR performance by the in-band distortion and out-of-band radiation is minimized. The above-described FIR feedback structure excessively improves ACLR performance, but has problems in EVM performance. Because EVM is directly related to throughput, it is preferable to improve EVM performance, while maintaining ACLR performance so as to meet SEM.

First, a description will be made of a peak windowing scheme according to an embodiment of the present invention. Next, a description will be given of various techniques for smoothing a clipping window c(n) when the peak windowing is applied.

Figure 13:
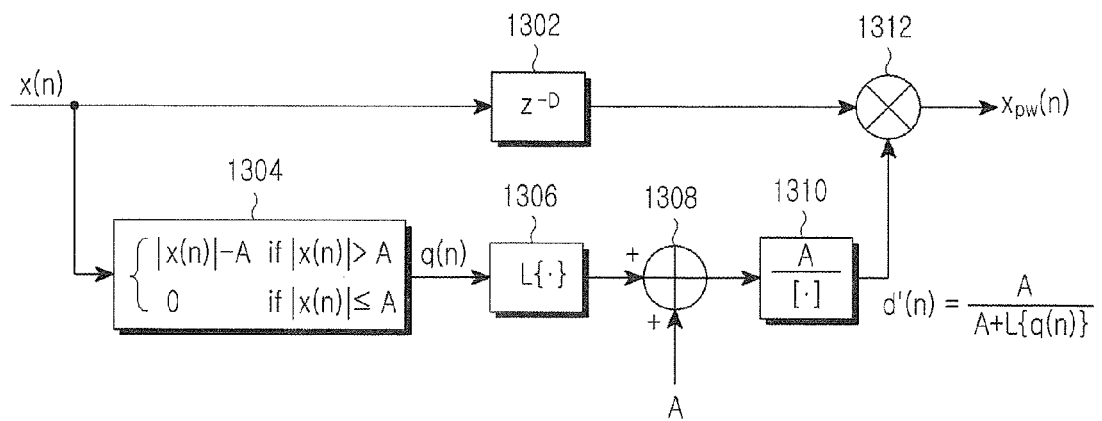
FIG. 13 is a diagram illustrating a structure of a CFR block that includes a peak windowing structure according to an embodiment of the present invention.

FIG. 13 illustrates a structure of a CFR block that includes a peak windowing structure according to an embodiment of the present invention.

Referring to FIG. 13, an input signal x(n), consisting of a data stream modulated by a modulation scheme such as OFDMA, SC-FDMA, and WCDMA, is input to a delay 1302 and an operator 1304. The delay 1302 delays the input signal x(n) by D, and then delivers the delayed signal to a multiplier 1312.

If a signal level of the input signal exceeds a clipping threshold level A, the operator 1304 generates a smoothed input signal q(n) by subtracting the predetermined clipping threshold level A from an absolute value of the input signal. Alternatively, if a signal level of the input signal does not exceed the clipping threshold level A, a smoothing input function q(n) becomes '0'.

Unlike the peak windowing structure of FIG. 6 in which the inversed signal A/|x(n)| is dealt with, the peak windowing structure of FIG. 13 deals with the non-inversed original signal x(n) intact. That is, in accordance with Equation (8)

below, a smoothed input signal q(n) is obtained by subtracting a clipping threshold level A from a portion of the input signal x(n), which is greater than A.

$$q(n) = \begin{cases} 0 & \text{if } |x(n)| \le A \\ |x(n)| - A & \text{if } |x(n)| > A \end{cases} \quad [\text{Eqn. 8}]$$

where q(n) is a clipped envelope signal, and a condition of q(n)>=0 is met.

A smoothing unit 1306 outputs L{q(n)} by performing a smoothing operation on the input q(n), and an adder 1308 adds A to L{q(n)}. An inverse calculator 1310 generates a signal d'(n) smoothed according to Equation (9) below, by multiplying the clipping threshold level A by an inverse of the output signal from the adder 1308.

$$d'(n) = \frac{A}{A + L\{q(n)\}} \quad [\text{Eqn. 9}]$$

Finally, the multiplier 1312 generates a peak-windowed signal $x_{pw}(n)$ by multiplying the input signal x(n) received through the delay 1302 by the output of the inverse calculator 1310. The peak-windowed signal is defined according to Equation (10) below.

$$x_{pw}(n) = \begin{cases} (x(n)) & \text{if } |x(n)| \le A \\ \dfrac{A}{A + L\{q(n)\}} x(n), & f\ |x(n)| > A \end{cases} \quad [\text{Eqn. 10}]$$

The smoothing unit 1306 may be implemented as described above in connection with FIG. 7 or 9, or may be implemented according to any one of the following embodiments.

Various embodiments of a smoothing unit applicable to the peak windowing structure of FIG. 6 or 9 (or FIG. 13) will be described below.

To be specific, four different solutions are presented, which improve EVM performance compared with the FIR feedback structures in FIGS. 7 and 9, by using at least one Extended Feedback Structure (EFS).
1) Asymmetric Convolutional Window (ACW)
2) Variable Feedback Gain (VFG)
3) Input Scaling Method (ISM)
4) Adaptive Feedback Windowing (AFW)

It should be noted that the below-described embodiments of a smoothing unit is applicable to the above-described peak windowing structure of FIG. 6, or peak windowing structure of FIG. 13. When the embodiments are applied to the peak windowing structure of FIG. 6, an input to the smoothing unit is p(n) defined as Equation (3), and when the embodiments are applied to the peak windowing structure of FIG. 13, an input to the smoothing unit is q(n) defined as Equation (8). While an input to the smoothing unit will be assumed herein as p(n) for convenience of description, it will be obvious to those of ordinary skill in the art that the following description is applicable even to the q(n).

1) ACW

ACW uses a structure of EFS{G, w(n)=asymmetric}. In other words, ACW has a window coefficient combination w(n) which is asymmetric on the left and right sides.

Figure 14:
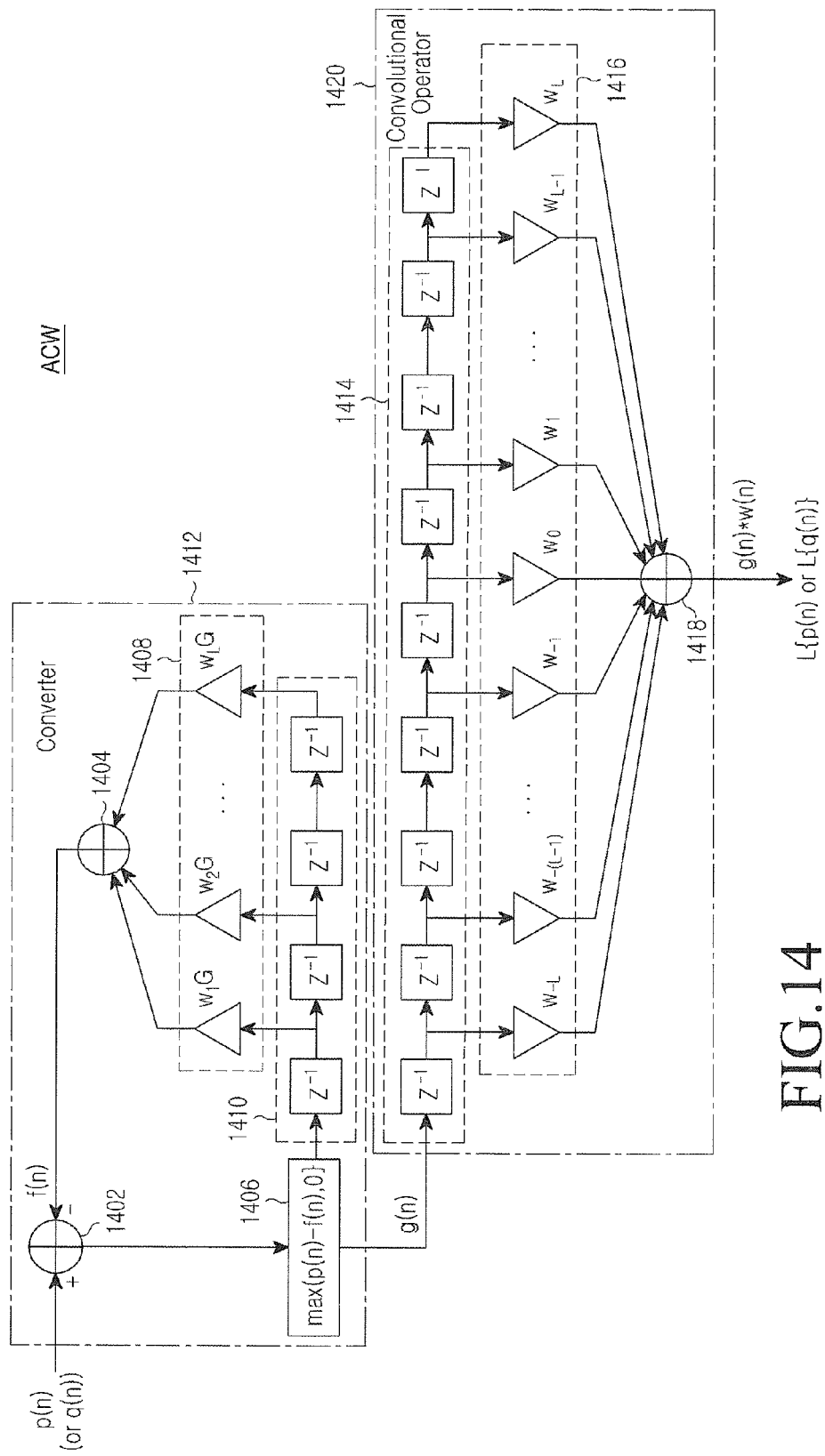
FIG. 14 is a diagram illustrating a smoothing unit that includes an Asymmetric Convolutional Window (ACW) structure according to an embodiment of the present invention.

FIG. 14 illustrates a smoothing unit that includes an ACW structure according to an embodiment of the present invention. Although will not be illustrated, the smoothing unit may further include an operator of calculating p(n) or q(n) depending on the peak windowing structure. As illustrated, a gain G is applied to a feedback path, and window coefficients w(n) are asymmetric on the left and right sides.

Referring to FIG. 14, samples of a smoothed input signal p(n)=1−c(n) (or q(n)=|x(n)|−A) are sequentially input. A subtractor 1402 subtracts a feedback signal f(n) received through a feedback path, from the input signal p(n). A maximum operator 1406 selects one of the p(n)−f(n) and '0', whichever is greater than the other, and inputs the selected value to a first stage of a first delay unit 1414 including (2L+1) cascaded delays in a convolutional operator 1420, and to a first stage of a second delay unit 1410 including L cascaded delays. An output of the maximum operator 1406 is called 'g(n)'.

Signals output from output taps of delays in the first delay unit 1414 are multiplied by their associated (2L+1) window coefficients w(n)={$w_{-L}, w_{-(L-1)}, \ldots, w_{-1}, w_0, \ldots, w_1, w_{L-1}, w_L$} for a convolutional operation by a first multiplication unit 1416. A first summer 1418 generates a smoothed signal L{p(n)} or L{q(n)} by summing up signals output from the first multiplication unit 1416, and the smoothed signal is provided to the subtractor 608 in FIG. 6, or the adder 1308 in FIG. 13.

Signals output from output taps of delays in the second delay unit 1410 are multiplied by their associated $w_1G, w_2G, \ldots w_LG$ by a second multiplication unit 1408, and then provided to a second summer 1404. Here, G represents a gain value that is multiplied by window coefficients for a convolutional operation in a feedback path consisting of the entities 1410, 1408 and 1404, and the gain value may be, for example, '1'. The second summer 1404 sums up the signals output from the second multiplication unit 1408, and feeds back the summed signal to the subtractor 1402. The second delay unit 1410, the second multiplication unit 1408, and the second summer 1404 constitute a feedback path in the smoothing unit, and the feedback path, the subtractor 1402 and the maximum operator 1406 constitute a converter 1412 for converting p(n) into g(n). In addition, the first delay unit 1414, the first multiplication unit 1416, and the first summer 1418 constitute the convolutional operator 1420 for multiplying g(n) by a windowing filter w(n). The first delay unit 1414 is responsible for delaying an input until a multiplication operation of up to $w_{-L} \sim w_L$ is completed in the convolutional operator 1420. In the actual implementation, the convolutional operator 1420 may use Canonical Signed Digit (CSD) rather than multipliers, for efficient implementation.

Filtering coefficients w(n) of the first multiplication unit 1416 in the convolutional operator 1420 are asymmetric on the left and right sides, i.e., meet the condition of Equation (11) below.

$$w_k \ne w_{-k}, \text{ for } k=1, \ldots L \quad [\text{Eqn. 11}]$$

Preferably, coefficients w-k on the left side, which are related to the signal not undergoing feedback, are less in value than coefficients wk on the right side, which are related to the signal undergoing feedback.

For example, if a Hanning window is applied to the right side of w(n) and a Gaussian window is applied to the left side thereof, then w(n) is defined as Equation (11-1) below.

$$w(n) = \begin{cases} \dfrac{1}{2}\left(1 + \cos\left(\dfrac{2\pi}{2L+2}n\right)\right) & \text{if } n \ge 0 \\ e^{-\gamma n^2} & \text{if } n < 0 \end{cases} \quad [\text{Eqn. 11-1}]$$

where L represents a right-side length of the Hanning window, and γ (gamma) determines a shape of the Gaussian window. The larger a value of γ becomes, the more sharply a magnitude thereof decreases. In addition, for G=1, coefficients of the feedback path become the same as the right-side coefficients of w(n), and in this situation, outputs g(n) of the feedback path meet Equation (12) below.

$$g(0) = p_0$$
$$g(1) = \max\{p_1 - g_0 w_1, 0\}$$
$$g(2) = \max\{p_2 - g_1 w_1 - g_0 w_2, 0\}$$
$$\vdots$$
$$g(n) = \begin{cases} \max\{p_n - g_{n-1}w_1 \ldots - g_0 w_n, 0\} & \text{if } n \le L \\ \max\{p_n - g_{n-1}w_1 \ldots - g_{n-L}w_L, 0\} & \text{if } n > L \end{cases}$$
[Eqn. 12]

No matter whether w(n) is symmetric or asymmetric, the condition of g(n)*w(n)>=p(n) is met. This can be proved by Equation (13) below.

The input sequence p(n) is fully covered by $$\sum_{k=0}^{L} w_k g_{n-k} \ge p(n)$$

$$\sum_{k=1}^{L} w_k g_{n-k} + \left(p_n - \sum_{k=1}^{L} w_k g_n - k\right) w_0 = p_n,$$

$$\text{if } p_n \ge \sum_{k=1}^{L} w_k g_{n-k}$$

$$\sum_{k=1}^{L} w_k g_{n-k} + 0 \ge p_n, \text{ otherwise.}$$

[Eqn. 13]

That is, since the condition of g(n)*w(n)>=p(n) is met even when w(n)=0 for n<0, it can be understood that the inequality is met even if w(n) is asymmetric. If the condition of L{p(n)}=g(n)*w(n)>=p(n) is met, a smoothed clipping function is c'(n)<=c(n). Then, c'(n) x(n)<=c(n)x(n)<=A, so that the peak-windowed signal may be maintained less in value than the clipping threshold level A. Being g(n)*w(n)>=p(n) is related to right-side coefficients of w(n), while occurrence of overshooting is related to left-side coefficients thereof, which is proved by Equation (14) below.

$$|\mathcal{L}\{p(n)\} - p(n)| \ge \sum_{k=1}^{L} g_{n+k} w_{-k}$$
[Eqn. 14]

Proof: By the definition $$\mathcal{L}\{p(n)\} = g(n) * w(n)$$

$$\mathcal{L}\{p(n)\} = \sum_{k=1}^{L} w_k g_{n-k} + g_n w_0 + \sum_{k=1}^{L} w_{-k} g_{n+k} \ge$$

$$\underbrace{p(n) + \sum_{k=1}^{L} w_{-k} g_{n+k}}_{\text{minimum excess term}} \ge p(n)$$

That is, by reducing amplitude of left coefficients of w(n), overshooting may be eased.

Figure 15A:
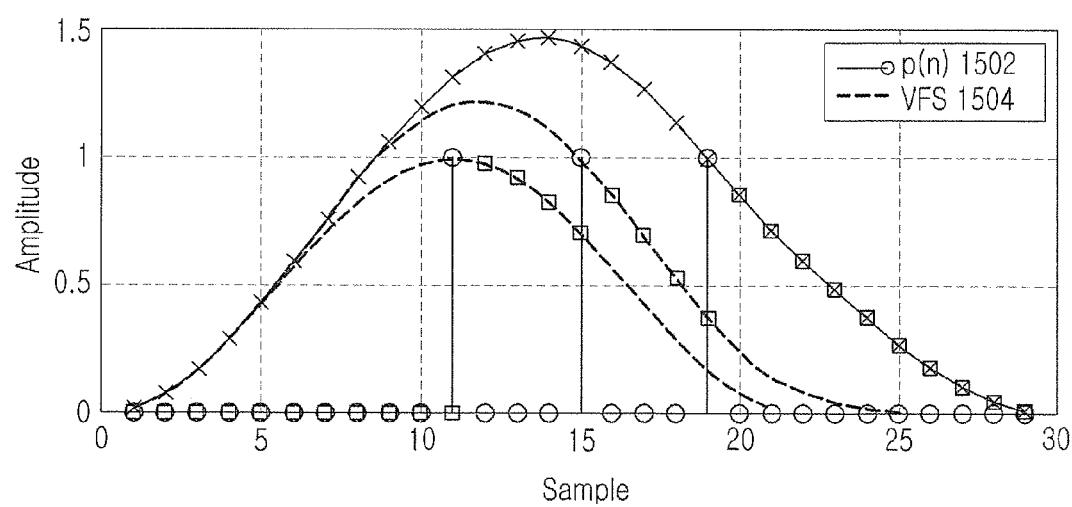
FIGS. 15A and 15B are diagrams illustrating the effects obtained by using ACW in the overshooting situation.
Figure 15B:
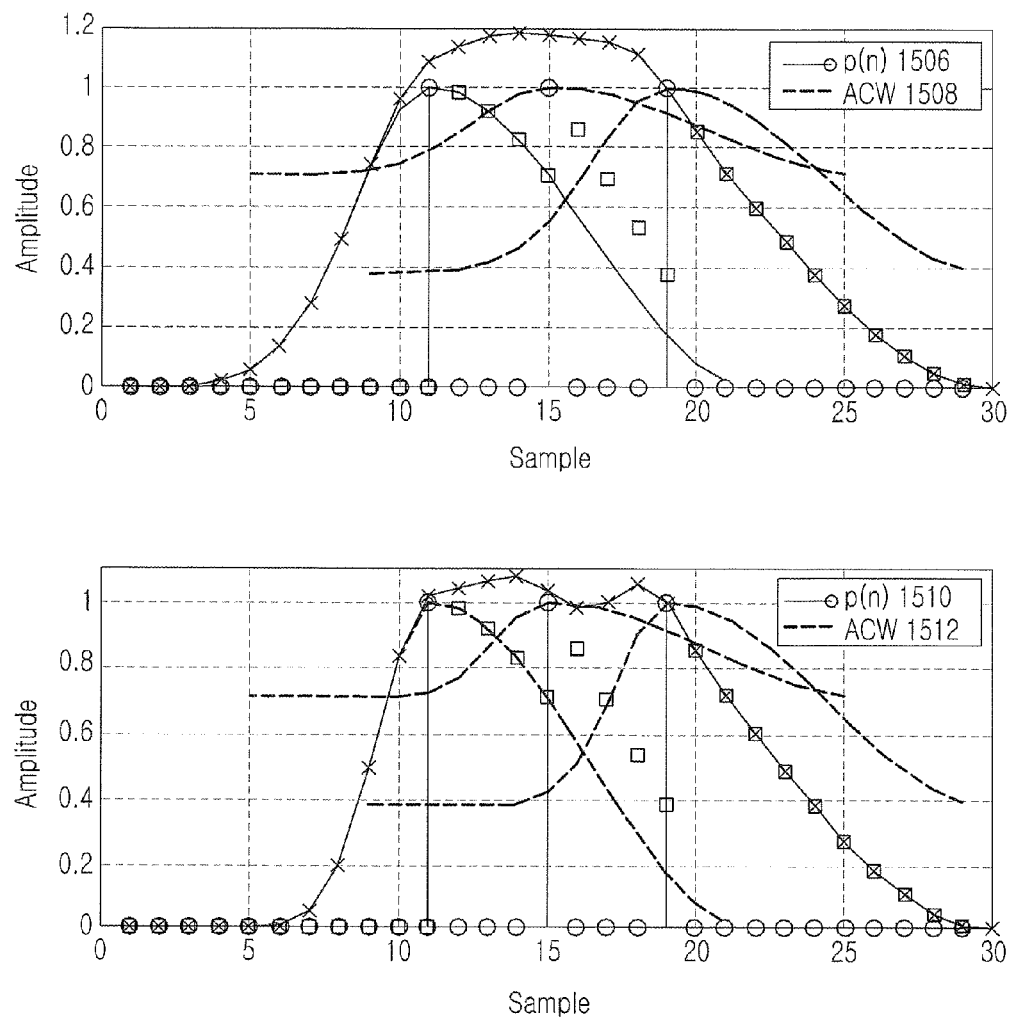

FIGS. 15A and 15B illustrate effects obtained by using ACW in the overshooting situation.

FIG. 15A illustrates outputs 1504 of the VFS that uses a left-right symmetric window for smoothed input signals p(n) 1502. As illustrated, it can be understood that compared with the input signal whose amplitude is '1', the maximum output becomes 1.5, causing overshooting.

The top graph in FIG. 15B illustrates outputs 1508 for smoothed input signals p(n) 1506 when right-side window coefficients are fixed and a Gaussian window is used in the left side. As illustrated, the maximum output is reduced below 1.2. The bottom graph in FIG. 15B illustrates outputs 1512 for smoothed input signals p(n) 1510 when a value of γ for determining a shape of a Gaussian window is further increased. As illustrated, the maximum output decreases below 1.1, when a Gaussian window is applied, whose value reduces more abruptly.

The reduction in overshooting value improves EVM performance. Alternatively, high-frequency components increase little by little, as illustrated in FIG. 15B. In other words, ACW contributes to a reduction in EVM, while maintaining the out-of-band radiation in an appropriate level satisfying a spectral mask.

2) VFG

VFG uses a plurality of ACW structures EFS{G, w(n)} as subblocks.

Figure 16:
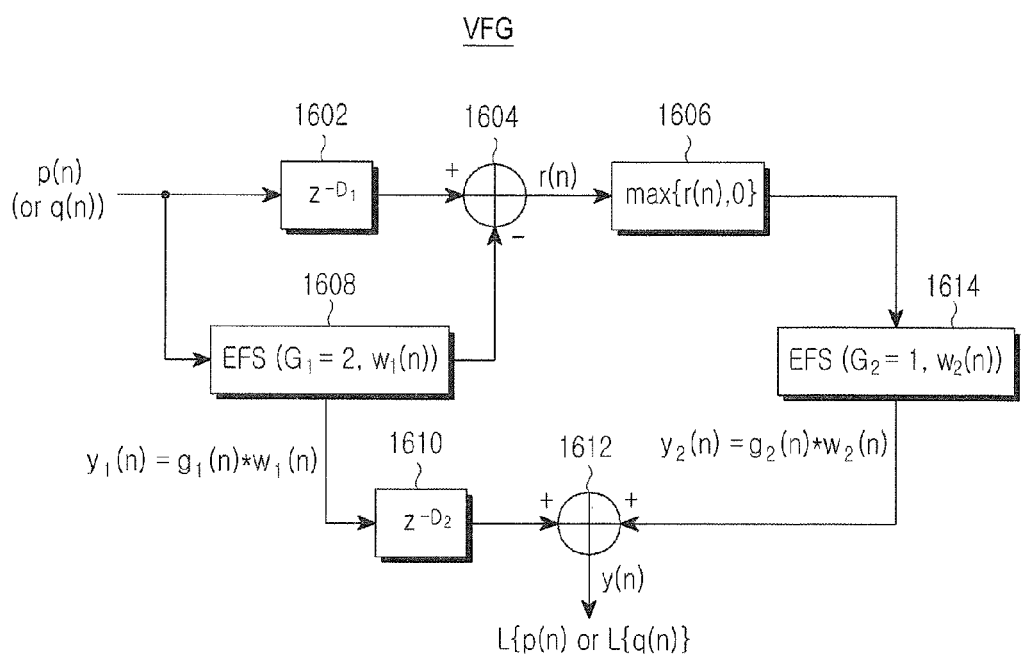
FIG. 16 is a diagram illustrating a smoothing unit that includes a Variable Feedback Gain (VFG) structure according to an embodiment of the present invention.

FIG. 16 illustrates a smoothing unit that includes a VFG structure according to an embodiment of the present invention. Although will not be illustrated, the smoothing unit may further include an operator of calculating p(n) or q(n) depending on the peak windowing structure. While two or more EFS blocks may be implemented in cascade stages, only two stages are used herein, for convenience of description.

Referring to FIG. 16, samples of a smoothed input signal p(n)=1-c(n) (or q(n)=|x(n)|-A) are sequentially input. A first delay 1602 delays the input signal p(n) by $D_1$ and inputs the delayed signal p(n-$D_1$) to a subtractor 1604. A first EFS block 1608, which is formed as shown in FIG. 14, receives p(n) and calculates $y_1(n)=g_1(n)*w_1(n)$ using a gain $G_1$ and a window coefficient combination $w_1(n)$. Here, $g_1(n)$ is acquired by the maximum operation in FIG. 14.

The subtractor 1604 calculates r(n)=p(n-$D_1$)-$g_1(n)*w_1(n)$ by subtracting the output of the first EFS block 1608 from the output of the first delay 1602. A maximum operator 1606 selects one of the r(n) and '0', whichever is greater than the other.

A second EFS block 1614, which is also constructed as illustrated in FIG. 14, receives the output of the maximum operator 1606, and calculates $y_2(n)=g_2(n)*w_2(n)$ using a gain $G_2$ and a window coefficient combination $w_2(n)$. Here, $g_2(n)$ is acquired by the maximum operation in FIG. 14. An adder 1612 generates a final signal L{p(n)} or L{q(n)}, which is smoothed by adding $g_1(n)*w_1(n)$, which is delayed by $D_2$ by a second delay 1610, to the output $g_2(n)*w_2(n)$ of the second EFS block 1614.

As for $G_1$ and $G_2$, the best-performance values corresponding to the number of EFS blocks are selected through several experiments. For example, $G_1=2$ and $G_2=1$. For better performance, $w_1(n)$ and $w_2(n)$ are preferably designed to include a symmetric coefficient combination and an asymmetric coefficient combination, respectively.

As described above, VFG has a structure in which at least two EFS blocks are cascaded. Generally, if G>1 in EFS{G, w(n)}, the condition of L{p(n)}=g(n)*w(n)>=p(n) is no longer met. However, as the feedback gain G is greater, g(n)=max{p(n)-f(n), 0}, and thus a level of g(n) is decreased, reducing overshooting. Therefore, a value of G, which allows L{p(n)} to well follow the curve of p(n) in a similar level on the average, may be determined through experiments. For example, G=2, if the number of EFS blocks is 2. A VFG algorithm may be summarized as shown in Equation (15) below.

| Algorithm 1 VFG algorithm |
|---|
| Initialize: $w_1(n)$ is symmetric, $w_2(n)$ is asymmetric, $G_1 > 1$,   [Eqn. 15]<br>$G_2 = 1$<br>1: $y_1(n) = g_1(n) * w_1(n) = EFS(p(n), G_1, w_1(n))$<br>2: $r(n) = \max\{p(n) - y(n), \_0\}$<br>3: $y_2(n) = g_2(n) * w_2(n) = EFS(r(n), G_2, w_2(n))$<br>4: return $y(n) = g_1(n) * w_1(n) + g_2(n) * w_2(n)$ |

A first line in Equation (15) is to calculate a first EFS$\{p(n), G_1, w_1(n)\}$, and its output result is $y_1(n)=g_1(n)*w_1(n)$. As for $w_1(n)$, using a symmetric window may help improve spectral performance of the final output. Since a condition of $y_1(n)>=p(n)$ is not always met, a residual $r(n)=\max\{p(n)-y_1(n), 0\}$ uncovered in $p(n)$ may exist. The residual $r(n)$ undergoes a second EFS$\{r(n), G_2, w_2(n)\}$. If $G_2=1$, its output result meets $g_2(n)*w_2(n)>=r(n)$. As a result, the final output meets $y(n)=y_1(n)+y_2(n)=g_1(n)*w_1(n)+g_2(n)*w_2(n)>=p(n)$.

Since a second EFS block covers only some samples uncovered by the first EFS block, the entire spectrum depends on $w_1(n)$. As for $w_2(n)$, both symmetric and asymmetric windows may be used. However, as described above, because overshooting depends on the left-side window, implementing $w_2(n)$ in an asymmetric window, (i.e., ACW scheme) is beneficial to EVM performance.

Figure 17:
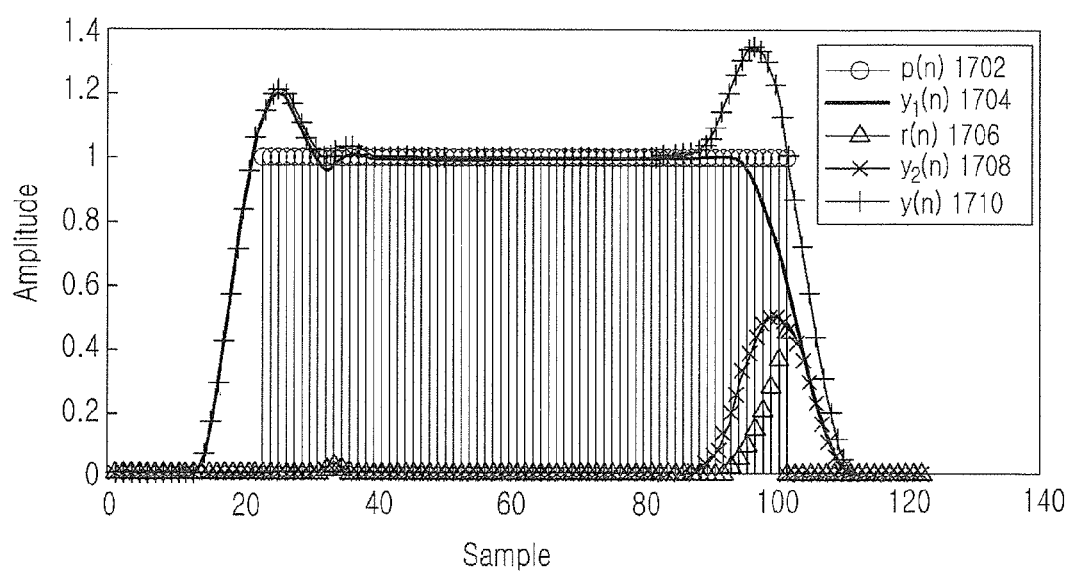
FIG. 17 is a diagram illustrating a VFG operation according to an embodiment of the present invention.

FIG. 17 illustrates a VFG operation according to an embodiment of the present invention, in which an output of each stage is shown when an input is $p(n)=1$ for $n=20, \ldots, 100$ as an extreme example.

Referring to FIG. 17, a curve 1702 represents a smoothed input signal $p(n)$, and a curve 1704 represents an output $y_1(n)$ of the first EFS block. Here, it is possible to determine the presence of $p(n)>y_1(n)$. A curve 1706 represents $r(n)$ corresponding to a difference between $p(n)$ and $y_1(n)$. If the $r(n)$ undergoes the second EFS block, $y_2(n)$ represented by a curve 1708 is output. The final result obtained by calculating $y(n)=y_1(n)+y_2(n)$ is represented by a curve 1710. It can be appreciated that $y(n)>=p(n)$.

Comparing VFG of FIG. 17 with the feedback structure of FIG. 15A, it can be understood that the final outputs 1504 in FIG. 15A bring overshooting of approximately double, whereas the final outputs 1710 in FIG. 17, except for the overshooting at the left and right edges thereof, are relatively well matched to $p(n)$, thus improving EVM.

For actual hardware implementation of VFG, two delays 1602 and 1610 are preferably used, and delay values thereof are set to processing delay times of the first and second EFS blocks 1608 and 1614, respectively.

3) ISM

Similarly to VFG, ISM also uses a plurality of EFS$\{G, w(n)\}$ as subblocks.

Figure 18:
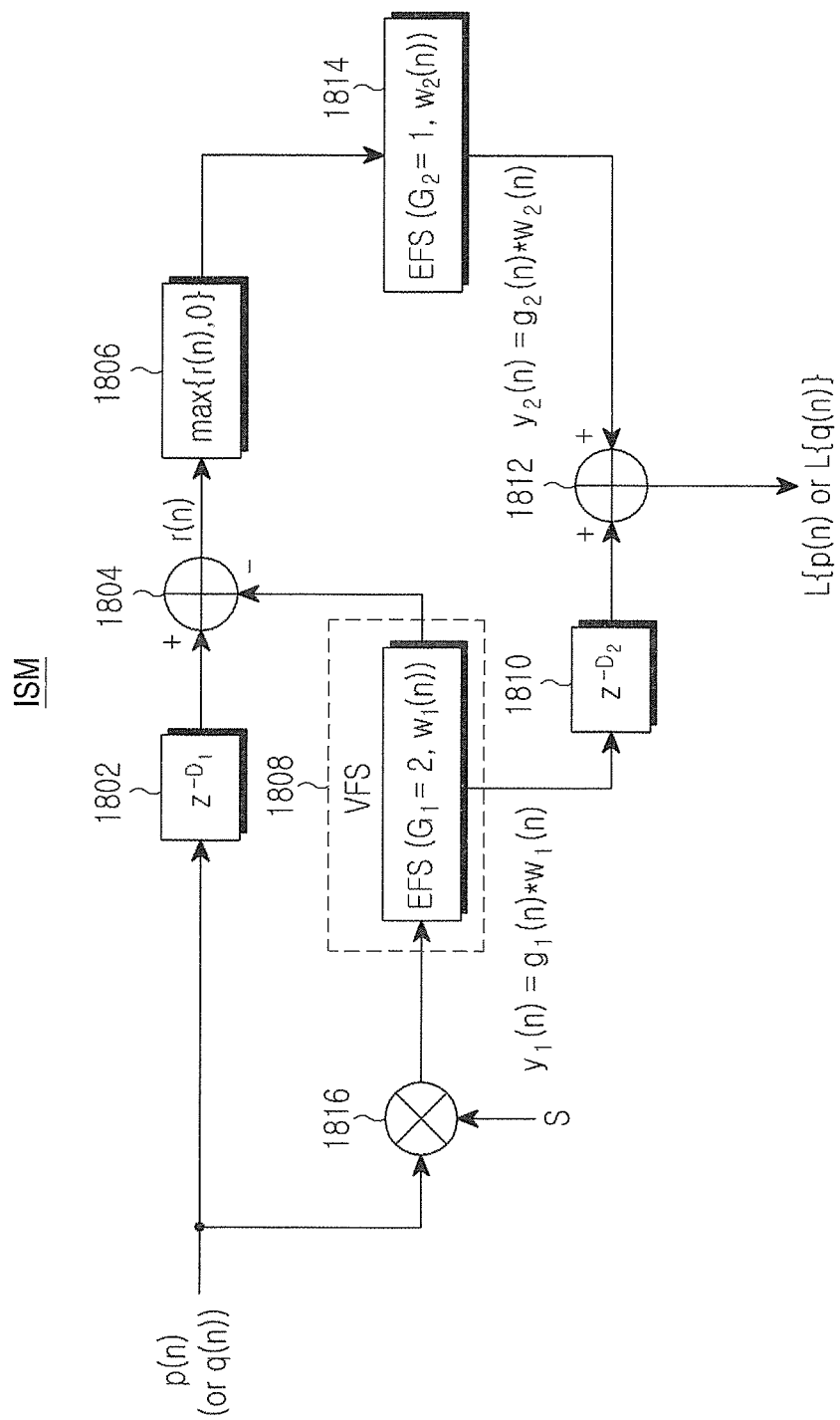
FIG. 18 is a diagram illustrating a smoothing unit that includes an Input Scaling Method (ISM) structure according to an embodiment of the present invention.

FIG. 18 illustrates a smoothing unit that includes an ISM structure according to an embodiment of the present invention. Although it will not be illustrated, the smoothing unit may further include an operator of calculating $p(n)$ or $q(n)$ depending on the peak windowing structure. While two or more EFS blocks may be implemented in cascade stages, only two stages are used herein, for convenience of description.

Referring to FIG. 18, samples of a smoothed input signal $p(n)=1-c(n)$ (or $q(n)=|x(n)|-A$) are sequentially input. A first delay 1802 delays the input signal $p(n)$ by $D_1$, and inputs the delayed signal $p(n-D_1)$ to a subtractor 1804. A multiplier 1816 multiplies the smoothed input signal $p(n)$ by a predetermined specific scale value S. A first EFS block 1808, which is formed as illustrated in FIG. 14, receives the output of the multiplier 1816, and calculates $y_1(n)=g_1(n)*w_1(n)$ using a gain $G_1=2$ and a window coefficient combination $w_1(n)$ [EFS$\{p(n)S, G_1, w_1(n)\}$].

A subtractor 1804 calculates $r(n)=p(n-D_1)-g_1(n)*w_1(n)$ by subtracting the output of the first EFS block 1808 from the output of the first delay 1802. A maximum operator 1806 calculates one of the $r(n)$ and '0', whichever is greater than the other.

A second EFS block 1814, which is also constructed as illustrated in FIG. 14, receives the output of the maximum operator 1806, and calculates $y_2(n)=g_2(n)*w_2(n)$ using a gain $G_2=1$ and a window coefficient combination $w_2(n)$ [EFS$\{r(n), G_2, w_2(n)\}$]. An adder 1812 generates a final signal L$\{p(n)\}$ or L$\{q(n)\}$, which is smoothed by adding $g_1(n)*w_1(n)$, which is delayed by $D_2$ by a second delay 1810, to the output $g_2(n)*w_2(n)$ of the second EFS block 1814.

The gains $G_1$ and $G_2$ in the EFS blocks 1808 and 1814 may be selected according to the number of EFS blocks, through experiments. As in VFG, for better performance, $w_1(n)$ and $w_2(n)$ are preferably designed to include a symmetric coefficient combination and an asymmetric coefficient combination, respectively.

ISM is almost similar to VFG in the overall principles. However, the first EFS block 1808 uses EFS$\{p(n)S, G_1, w_1(n)\}$, where $G_1=1$, and $w_1(n)$=symmetric window, by way of example. The scale value S applied to the first EFS block 1808 is calculated using Equation (16).

$$\frac{p(n)}{L\{p(n)\}} \rightarrow \frac{\sum_{k=1}^{L} w_1(k)}{\sum_{k=-L}^{L} w_1(k)} \quad \text{[Eqn. 16]}$$

The second EFS block 1814 uses EFS$\{r(n), G_2, w_2(n)\}$, where $G_2=1$, and $w_2(n)$=asymmetric window, by way of example.

ISM has been derived as a result of thoroughly analyzing an overshooting operation of a typical feedback structure. That is, since the scale value S represents a ratio of L$\{p(n)\}$ to $p(n)$ and the VFS scheme is deterministic, the VFS results may be estimated in advance. Therefore, ISM compensates the smoothed input signal $p(n)$ as much as the amount S of occurring overshooting, thereby causing the final output to well follow $p(n)$. By doing so, ISM noticeably improves EVM performance, compared with a typical feedback structure.

The ISM algorithm may be summarized as shown in Equation (17) below.

| Algorithm 2 ISM algorithm |
|---|
| Initialize: $w_1(n)$ is symmetric, $w_2(n)$ is asymmetric, $G_1 = 1$,   [Eqn. 17]<br>$G_2 = 1$<br>1: $y_1(n) = g_1(n) * w_1(n) =$<br>$$EFS\left(p(n) \Big/ \frac{\sum_{k=-L}^{L} w(k)}{\sum_{k=0}^{L} w(k)}, G_1 w_1(n)\right)$$<br>2: $r(n) = \max\{p(n) - y(n), \_0\}$<br>3: $y_2(n) = g_2(n) * w_2(n) = EFS(r(n), G_1, w_2(n))$<br>4: return $y(n) = g_1(n) * w_1(n) + g_2(n) * w_2(n)$ |

For actual hardware implementation of ISM, two delays 1802 and 1810 are preferably used, and delay values thereof are set to processing delay times of the first and second EFS blocks 1808 and 1814, respectively.

Figure 19A:
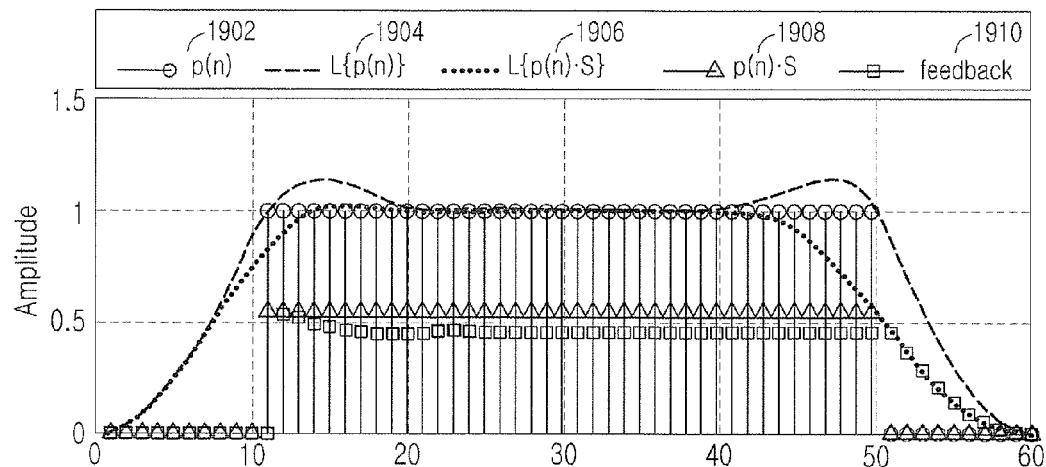
FIGS. 19A and 19B are diagrams illustrating an ISM operation according to an embodiment of the present invention.
Figure 19B:
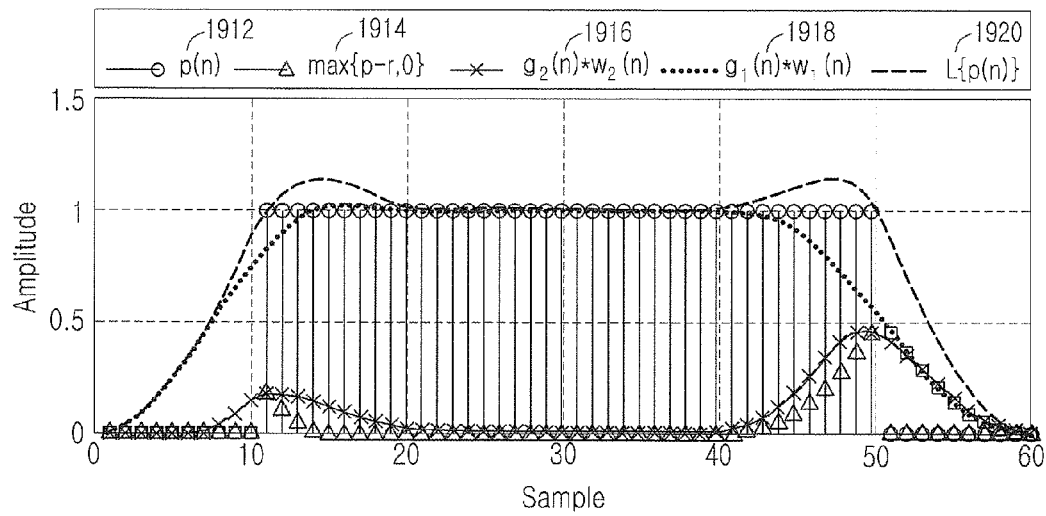

FIGS. 19A and 19B illustrate an ISM operation according to an embodiment of the present invention.

Referring to FIG. 19A, a curve 1902 represents a smoothed input signal p(n), a curve 1904 represents L{p(n)}, and a curve 1908 represents p(n)S. A curve 1906 represents an output $y_1(n)=g_1(n)*w_1(n)$ of a first EFS block. A feedback signal $g_1(n)$ is represented by a curve 1910. Here, it is possible to determine the presence of a portion where $y_1(n)<p(n)$.

Referring to FIG. 19B, a curve 1912 represents a smoothed input signal p(n), and a curve 1914 represents $r(n)=\max\{y_1(n)-p(n)S, 0\}$. In addition, a curve 1916 represents an output $y_2(n)$ of a second EFS block, and a curve 1918 represents $y_1(n)$. Here, $y(n)=y_1(n)+y_2(n)$ is represented by a curve 1920. It can be appreciated that a condition of $y(n)>=p(n)$ is met, and a smooth curve $y(n)=L\{p(n)\}$ is output, in which high-frequency components of p(n) are removed, reducing EVM effects.

4) AFW

Unlike VFG and ISM using window coefficients fixed for their associated EFS blocks, AFW may be an extended ACW scheme that changes left-side window coefficients according to the ratio of a feedback output f(n) to p(n).

Figure 20:
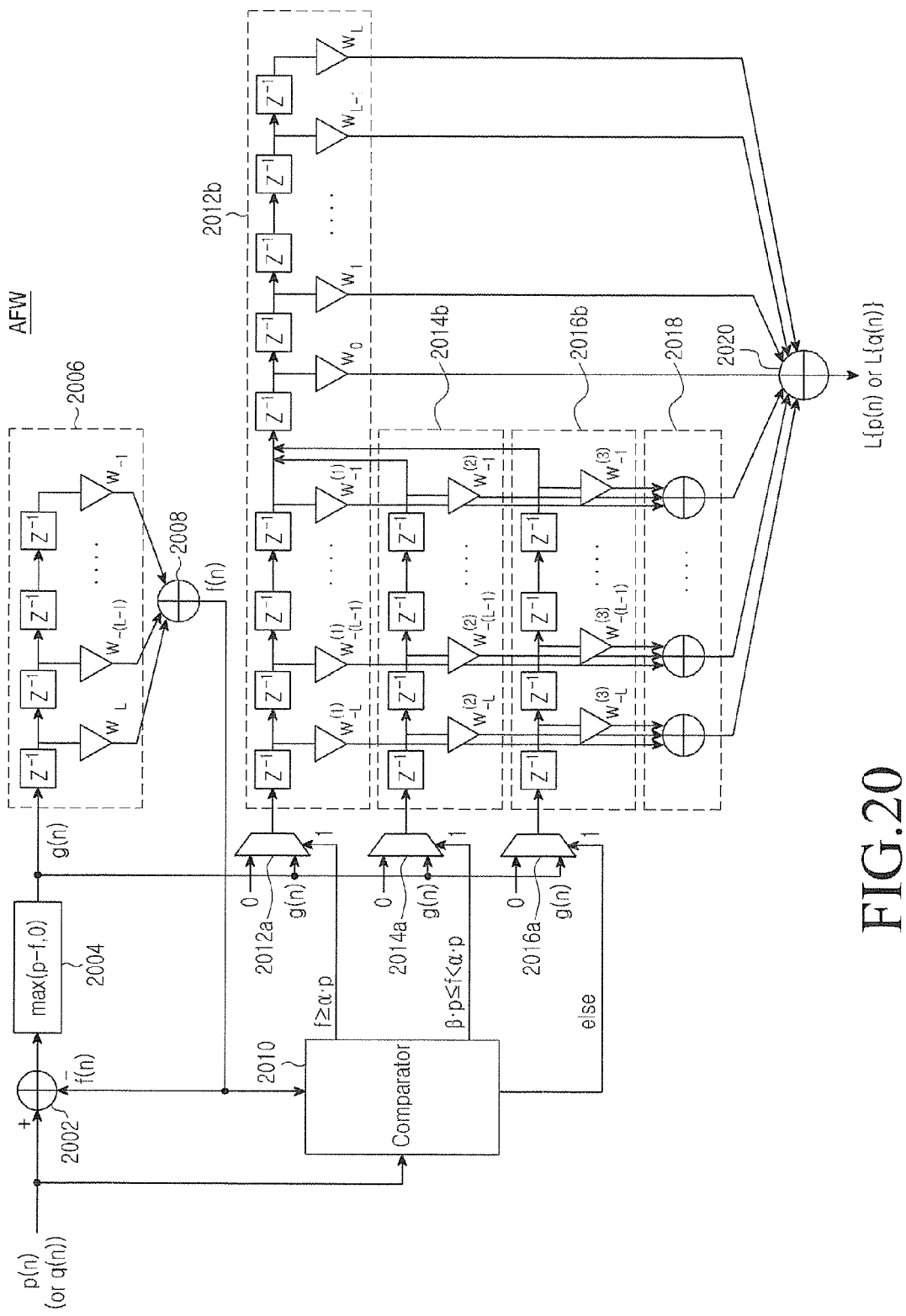
FIG. 20 is a diagram illustrating a smoothing unit that includes an Adaptive Feedback Windowing (AFW) structure according to an embodiment of the present invention.

FIG. 20 illustrates a smoothing unit that includes an AFW structure according to an embodiment of the present invention. Although it will not be illustrated, the smoothing unit may further include an operator of calculating p(n) or q(n) depending on the peak windowing structure. For example, a structure with a filter block including three kinds of asymmetric windows is provided herein to consider the ratio of f(n) to p(n).

Referring to FIG. 20, samples of a smoothed input signal p(n)=1−c(n) (or q(n)=|x(n)|−A) are sequentially input. A subtractor 2002 subtracts a feedback signal f(n) received through a feedback path, from the input signal p(n). A maximum operator 2004 selects one of the p(n)−f(n) and '0', which is greater than the other, and inputs the selected value to L cascaded delays in a convolutional operator 2006 and to selectors 2012a, 2014a, and 2016a in asymmetric window stages 2012a/b, 2014a/b, and 2016a/b. An output of the maximum operator 2004 is called 'g(n)'. In the convolutional operator 2006, samples of g(n) are multiplied by their associated L window coefficients $w(n)=\{w_{-L}, w_{-(L-1)}, \ldots, w_{-1}\}$ for a convolutional operation. A first summer 2008 generates a feedback signal f(n) by summing up signals output from the convolutional operator 2006, and the f(n) is provided to the subtractor 2002 and a comparator 2010.

The comparator 2010 compares the smoothed input signal p(n) with the feedback signal f(n), and provides a selection signal to one of the plurality of asymmetric window stages 2012a/b, 2014a/b, and 2016a/b according to the ratio of f(n) to p(n). Upon receiving the selection signal from the comparator 2010, each of the asymmetric window stages 2012a/b, 2014a/b, and 2016a/b multiplies the g(n) provided from the maximum operator 2004 by its associated window coefficients among $w_1(n)$, $w_2(n)$, and $w_3(n)$. Here, $w_1(n)$ includes $w^{(1)}_{-L}, w^{(1)}_{-(L-1)}, \ldots w^{(1)}_{-1}, w_0, w_1, \ldots w_{L-1}, w_L$; $w_2(n)$ includes $w^{(2)}_{-L}, w^{(2)}_{-(L-1)}, \ldots w^{(2)}_{-1}$; and $w_3(n)$ includes $w^{(3)}_{-L}, w^{(3)}_{-(L-1)}, \ldots w^{(3)}_{-1}$. In other words, second and succeeding asymmetric window stages 2014a/b and 2016a/b are made by selectively changing the left half of asymmetric window coefficients of the first asymmetric window stage 2012a/b. In actual implementation, the asymmetric window stages 2012, 2014, and 2016 may be efficiently implemented by using CSD instead of multipliers.

To be specific, the comparator 2010 compares the ratio of f(n) to p(n), with a plurality of thresholds, for example, α and β. For example, α=0.9 and β=0.1. When f(n)>=αp(n), the window stage 2012a/b associated with $w_1(n)$ is used. When βp(n)<=f(n)<αp(n), the window stage 2014a/b associated with $w_2(n)$ is used. When f(n)<βp(n), the window stage 2016a/b associated with $w_3(n)$ is used. Preferably, a window stage closer to be symmetric is used for a smaller f(n).

A summation unit 2018 sums up outputs multiplied by the left-side window coefficients of the asymmetric window stages 2012, 2014, and 2016 on a coefficient basis, and a second summer 2020 generates a smoothed signal L{p(n)} or L{q(n)} by summing up outputs multiplied by all window coefficients. The smoothed signal is provided to the subtractor 608 in FIG. 6, or the adder 1308 in FIG. 13.

It can be appreciated that in the above AFW structure, while the central window coefficient $w_0$ and L right-side window coefficients $w_1, \ldots w_L$ are fixedly determined, L left-side window coefficients are adaptively determined according to the ratio of the feedback signal f(n) to the smoothed input signal p(n). Preferably, window coefficients closer to be symmetric may be used for a smaller f(n). In other words, as f(n) is smaller than p(n), L left-side window coefficients may approximate L right-side window coefficients.

That is, as a feedback signal f(n) is smaller, which means that a generated non-zero p(n) is far apart from the previous sample, using symmetric windows may improve spectral performance. As the ratio of f(n) to p(n) is higher, which means that the previous sample is close to the current sample, overshooting may be reduced by using windows whose left side is small in size.

Figure 21:
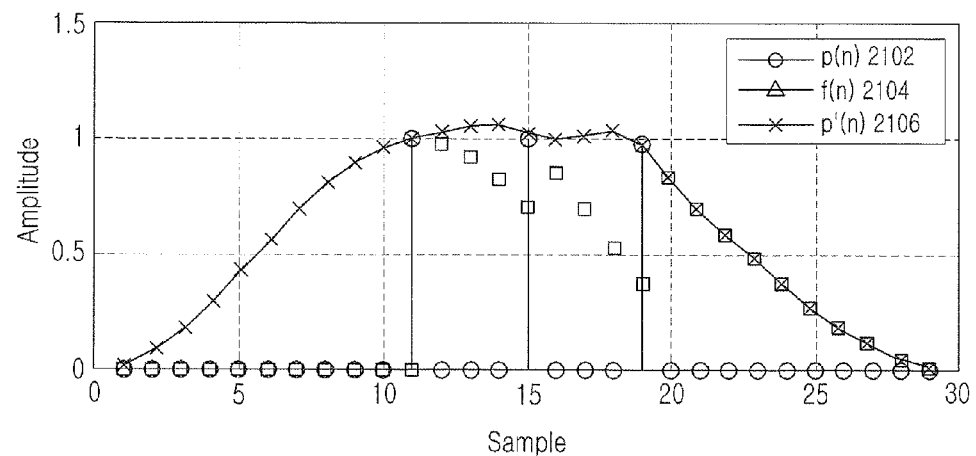
FIG. 21 is a diagram illustrating an operation of an AFW structure according to an embodiment of the present invention.

FIG. 21 illustrates an operation of an AFW structure according to an embodiment of the present invention.

Referring to FIG. 21, a curve 2102 represents a smoothed input signal p(n), a curve 2104 represents a feedback signal f(n), and the output result L{p(n)}=p'(n) of AFW is represented by a curve 2106. Compared with the ACW structure using a symmetric window, the AFW structure avoids excessive overshooting by adaptively using different asymmetric windows.

In FIG. 21, it can be understood that for an input sample with p(n)=1 for n=11, since a feedback sample is f(n)=0 for n=11, which correspond to f(n)<=0.1p(n), a window, which is left-right symmetric about p(11), was used. Comparing p(n) with f(n) at n=15 and 19, since 0.1p(n)<=f(n)<0.9p(n), asymmetric windows were used. Therefore, the overall smooth curve is output, improving EVM performance compared with the VFS structure.

By outputting an excessively smooth curve, the typical feedback structure has excellent out-of-band radiation spectral performance, but has unsatisfactory EVM performance. Although the spectral performance is allowed to be determined to meet a desired spectral mask since it serves as interference to other users, EVM is directly related to the user's throughput as it directly affects BER. Therefore, it is preferable to minimize EVM gradation.

Figure 22:
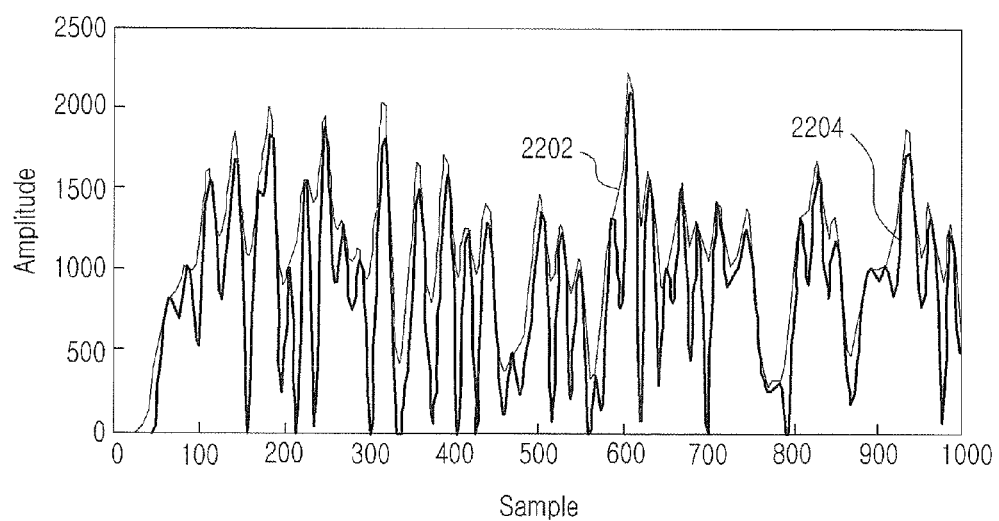
FIGS. 22 and 23 are graphs illustrating improved EVM performances of a smoothing unit according to an embodiment of the present invention.

FIG. 22 illustrates improved EVM performance of a smoothing unit according to an embodiment of the present invention. Here, a curve 2202 represents a smoothed input signal q(n), and the output result L{q(n)} in VFG or ISM is represented by a curve 2204. Comparing the curve 2204 in FIG. 22 with that in FIG. 11, it can be noted that when an input signal x(n) and a clipping threshold level A are given, VFG or ISM generates almost no overshooting, compared with the typical feedback structure.

Figure 23:
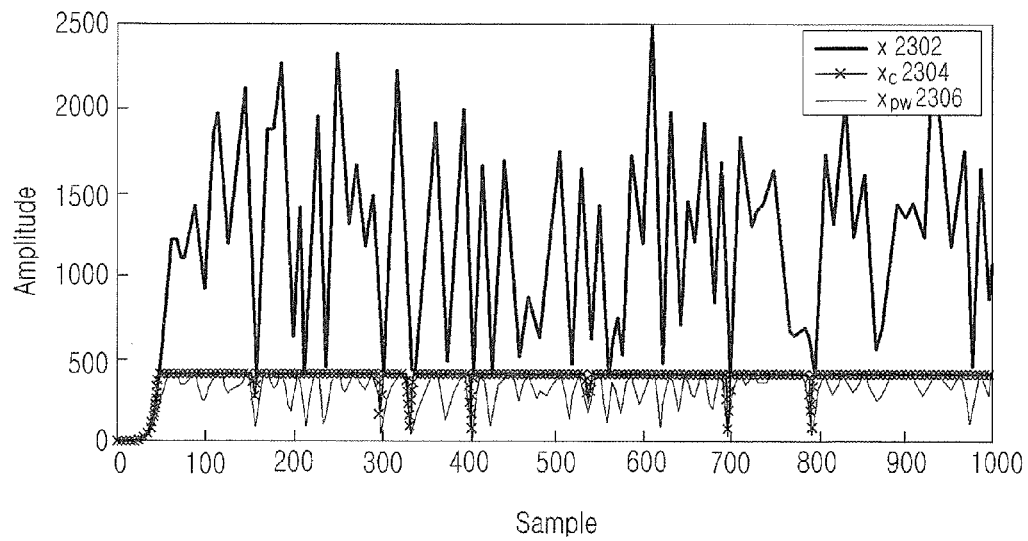

FIG. 23 illustrates improved EVM performance of a peak windowing structure according to an embodiment of the present invention. Here, a curve 2302 represents an input signal x(n), a curve 2304 represents a clipped signal $x_c(n)$, and a peak-windowed signal $x_{pw}(n)$ is represented by a curve 2306. Comparing the curve 2306 in FIG. 23 with that in FIG. 12, even in a very low clipping threshold level, no peak regrowth occurs and the peak-windowed signal maintains a value which is less than A. It can be understood that compared with the clipping curve 2304, the smooth curve 2306 similar to the input signal x(n) 2302 is output, so that the out-of-band radiation is not so significant.

Figure 24:
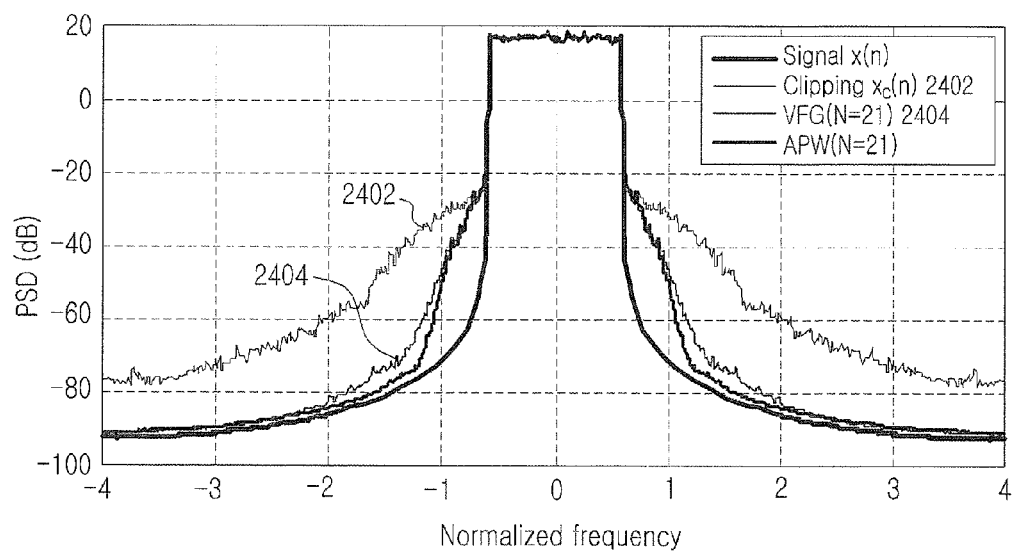
FIG. 24 is a graph illustrating out-of-band radiation performance of a smoothing unit according to an embodiment of the present invention.

FIG. 24 illustrates out-of-band radiation performance of a smoothing unit according to an embodiment of the present invention. As illustrated, it is noted that a VFG curve 2404 using a window with a length=21 has the noticeably reduced out-of-band radiation, compared with a clipped signal 2402. This can easily meet the spectral mask.

Figure 25:
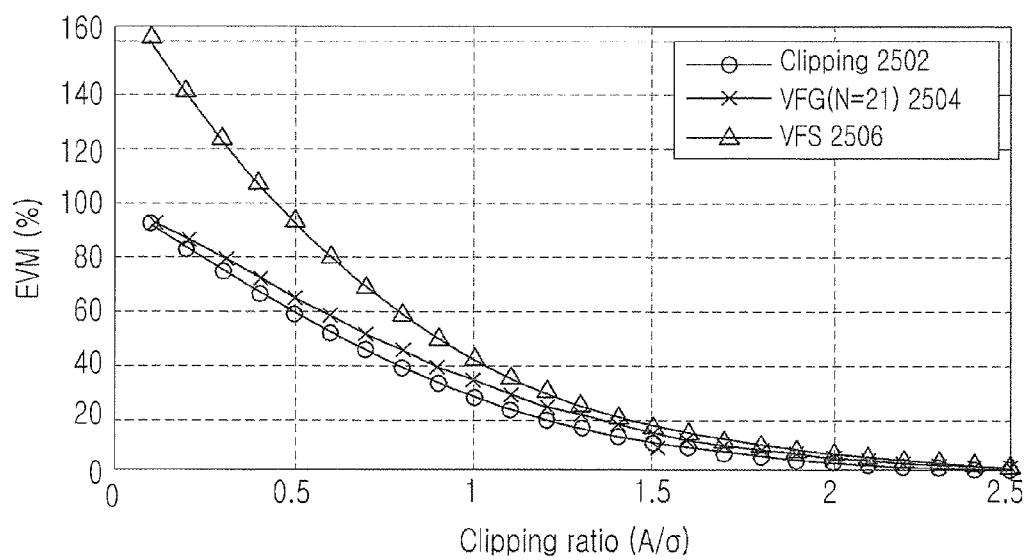
FIG. 25 is a graph illustrating improved EVM performance of a smoothing unit according to an embodiment of the present invention.

FIG. 25 illustrates improved EVM performance of a smoothing unit according to an embodiment of the present invention. As illustrated, it can be understood that compared with a VFS curve 2506, a VFG curve 2504 using a window with a length=21 is robust even in the worst case, and its overall EVM performance is improved similar to that of a clipped signal 2502.

As is apparent from the foregoing description, in order to reduce a PAPR of an input signal for a PA, the present invention employs peak windowing including a multi-feedback structure, thereby improving EVM performance while maintaining the spectral performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A smoothing apparatus for peak windowing, comprising:
an operator configured to generate a first input signal for smoothing using an input signal for peak windowing and a predetermined clipping threshold level;
a subtractor configured to subtract a first feedback signal from the first input signal;
a maximum operator configured to generate a second input signal comprising a greater of each sample of the subtracted signal and zero;
a feedback path configured to generate a next feedback signal for a next smoothed input signal by multiplying samples of the second input signal by window coefficients in a first window coefficient combination and a predetermined gain and sum up the multiplication results; and
a convolutional operator configured to generate a smoothed signal by multiplying samples of the second input signal by window coefficients in a second window coefficient combination for low pass filtering and summing up the multiplication results;
wherein the second window coefficient combination includes the first window coefficient combination and a third window coefficient combination, the third window coefficient combination being different from the first window coefficient combination.

2. The smoothing apparatus of claim 1, wherein the first input signal is calculated by the following equation, $$p(n) = 1 - c(n) = \begin{cases} 1 - \frac{A}{|x(n)|}, & \text{if } |x(n)| > A \\ 0 & \text{if } |x(n)| \le A \end{cases}$$

wherein x(n) represents the input signal, wherein c(n) represents a clipping function, wherein p(n) represents the first input signal, and A represents the predetermined clipping threshold level.

3. The smoothing apparatus of claim 1, wherein the first input signal is calculated by the following equation, $$q(n) = \begin{cases} 0 & \text{if } |x(n)| \le A \\ |x(n)| - A & \text{if } |x(n)| < A \end{cases}$$

wherein x(n) represents the first input signal, wherein q(n) represents the first input signal, and A represents the predetermined clipping threshold level.

4. The smoothing apparatus of claim 1, wherein the first window coefficient combination includes $\{w_L, w_{L-1}, \ldots, w_1\}$, and the second window coefficient combination includes $\{w_{-L}, w_{-(L-1)}, \ldots, w_{-1}, w_0, \ldots, w_1, w_{L-1}, w_L\}$, wherein window coefficients included in the window coefficient combinations meet the following equation, $$w_k \ne w_{-k}, \text{ for } k=1, \ldots, L$$

wherein L represents a number of window coefficients included in the first window coefficient combination.

5. The smoothing apparatus of claim 1, wherein the feedback path comprises:
L cascaded delays configured to receive the second input signal;
a multiplication unit configured to multiply signals output from output taps of the delays by the gain and L window coefficients constituting the first window coefficient combination; and
a summer configured to sum up outputs of the multiplication unit.

6. The smoothing apparatus of claim 5, wherein the convolutional operator comprises:
(2L+1) cascaded delays configured to receive the second input signal;
a multiplication unit configured to multiply signals output from output taps of the delays by (2L+1) window coefficients constituting the second window coefficient combination; and
a summer configured to sum up outputs of the multiplication unit.

7. The smoothing apparatus of claim 1, wherein the second window coefficient combination includes a fixed central window coefficient, L fixed first window coefficients, and L second window coefficients.

8. The smoothing apparatus of claim 7, wherein the second window coefficients of the second window coefficient combination are close to the first window coefficients of the first window coefficient combination so that the next feedback signal is smaller than the input signal.

9. The smoothing apparatus of claim 1, further comprising: an extended feedback structure, wherein the extended feedback structure is one of an Asymmetric Convolutional Window, a Variable Feedback Gain, an Input Scaling Method, and an Adaptive Feedback Windowing.

10. The smoothing apparatus of claim 1, further comprising a multiplier configured to multiply the first input signal by a predetermined specific scale value, and input the multiplication result to the subtractor.

11. The smoothing apparatus of claim 10, wherein the scale value is calculated by the following equation, $$\frac{p(n)}{L\{p(n)\}} \rightarrow \frac{\sum_{k=1}^{L} w_1(k)}{\sum_{k=-L}^{L} w_1(k)}$$

where p(n) represents the input signal for peak windowing, $w_1(k)$ represents a k-th window coefficient in the first window coefficient combination, and L represents a number of window coefficients in the first window coefficient combination.

12. A method for peak windowing, comprising:
generating, by an operator, a first input signal for smoothing using an input signal for peak windowing and a predetermined clipping threshold level;
subtracing, by a subtractor, a first feedback signal from the first input signal;
generating, by a maximum operator, a second input signal comprising a greater of each sample of the subtracted signal and zero;
generating, by a feedback path, a next feedback signal for a next smoothed input signal by multiplying samples of the second input signal by window coefficients in a first window coefficient combination and a predetermined gain and summing up the multiplication results; and
generating, by a convolutional operator, a smoothed signal by multiplying samples of the second input signal by window coefficients in a second window coefficient combination for low pass filtering and summing up the multiplication results;
wherein the second window coefficient combination comprises the first window coefficient combination and a third window coefficient combination, the third window coefficient combination being different from the first window coefficient combination.

13. The method of claim 12, wherein the first input signal is calculated by the following equation, $$p(n) = 1 - c(n) = \begin{cases} 1 - \frac{A}{|x(n)|}, & \text{if } |x(n)| > A \\ 0 & \text{if } |x(n)| \le A \end{cases}$$

wherein x(n) represents the input signal, wherein c(n) represents a clipping function, wherein p(n) represents the first input signal, and A represents the predetermined clipping threshold level.

14. The method of claim 12, wherein the first input signal is calculated by the following equation, $$q(n) = \begin{cases} 0 & \text{if } |x(n)| \le A \\ |x(n)| - A & \text{if } |x(n)| > A \end{cases}$$

wherein x(n) represents the first input signal, wherein q(n) represents the first input signal, and A represents the predetermined clipping threshold level.

15. The method of claim 12, wherein the first window coefficient combination includes $\{w_L, w_{L-1}, \ldots, w_1\}$, and the second window coefficient combination includes $\{w_{-L}, w_{-(L-1)}, \ldots, w_{-1}, w_0, \ldots, w_1, w_{L-1}, w_L\}$, wherein window coefficients included in the window coefficient combinations meet the following equation, $w_k \ne w_{-k}$, for k=1, ..., L wherein L represents a number of window coefficients included in the first window coefficient combination.

16. The method of claim 12, wherein the feedback path comprises:
receiving the second input signal;
multiplying signals output from output taps of the delays by the gain and L window coefficients constituting the first window coefficient combination; and
summing outputs of the multiplication unit.

17. The method of claim 16, wherein the convolutional operator comprises:
receiving the second input signal;
multiplying signals output from output taps of the delays by (2L+1) window coefficients constituting the second window coefficient combination; and
summing outputs of the multiplication unit.

18. The method of claim 12, wherein the second window coefficient combination includes a fixed central window coefficient, L fixed first window coefficients, and L second window coefficients.

19. The method of claim 18, wherein the second window coefficients of the second window coefficient combination are close to the first window coefficients of the first window coefficient combination so that the next feedback signal is smaller than the input signal.

20. The smoothing apparatus of claim 12, further comprising:
multiplying the first input signal by a predetermined specific scale value, and
inputting the multiplication result to the subtractor.

* * * * *